(12) United States Patent
Moon et al.

(10) Patent No.: US 9,798,657 B2
(45) Date of Patent: Oct. 24, 2017

(54) DATA STORAGE DEVICE INCLUDING NONVOLATILE MEMORY DEVICE AND OPERATING METHOD THEREOF

(71) Applicants: Sangkwon Moon, Osan-si (KR); Seung-Yeon Lee, Seoul (KR); Heewon Lee, Suwon-si (KR); In Hwan Doh, Seoul (KR); NamWook Kang, Hwaseong-si (KR)

(72) Inventors: Sangkwon Moon, Osan-si (KR); Seung-Yeon Lee, Seoul (KR); Heewon Lee, Suwon-si (KR); In Hwan Doh, Seoul (KR); NamWook Kang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 127 days.

(21) Appl. No.: 14/825,853

(22) Filed: Aug. 13, 2015

(65) Prior Publication Data

US 2016/0110114 A1     Apr. 21, 2016

Related U.S. Application Data

(60) Provisional application No. 62/064,093, filed on Oct. 15, 2014.

(30) Foreign Application Priority Data

Nov. 21, 2014 (KR) ........................ 10-2014-0163396

(51) Int. Cl.
*G06F 3/06* (2006.01)
*G06F 12/02* (2006.01)

(52) U.S. Cl.
CPC ...... *G06F 12/0246* (2013.01); *G06F 12/0253* (2013.01); *G06F 3/0614* (2013.01);
(Continued)

(58) Field of Classification Search
CPC .. G06F 12/0253; G06F 12/0246; G06F 12/12; G06F 12/127; G06F 2212/1016;
(Continued)

(56) References Cited

U.S. PATENT DOCUMENTS 7,451,265 B2   11/2008  Traister et al.
7,679,133 B2    3/2010  Son et al.
(Continued)

FOREIGN PATENT DOCUMENTS

JP    2006134136 A     5/2006
JP    2011-227835 A   11/2011

*Primary Examiner* — Michael Krofcheck
(74) *Attorney, Agent, or Firm* — Harness, Dickey & Pierce, P.L.C.

(57) ABSTRACT

A method of operating a data storage device includes programming non-fully programmed memory blocks at a point in time when a reference time elapses from a point in time when each of the memory blocks is physically erased, acquiring a first interval and a second interval, calculating a disturb index based on the first interval and the second interval, selecting a victim block for garbage collection based on the disturb index, and copying valid page data of the victim block into a free block. The first interval is defined by a point in time when each of the memory blocks is physically erased and a point in time when each of the memory blocks is fully programmed. The second interval is an interval during which a fully programmed state is maintained after a point in time when each of the memory blocks is fully programmed.

21 Claims, 22 Drawing Sheets

(52) U.S. Cl.
CPC .......... *G06F 3/0652* (2013.01); *G06F 3/0679* (2013.01); *G06F 2212/1016* (2013.01); *G06F 2212/1032* (2013.01); *G06F 2212/7205* (2013.01); *G06F 2212/7209* (2013.01)

(58) Field of Classification Search
CPC ..... G06F 2212/1032; G06F 2212/7209; G06F 2212/7205; G06F 3/0652; G06F 3/0679; G06F 3/0608; G06F 3/0614; G06F 3/0616; G06F 3/0619; G06F 3/0649; G06F 3/0688
See application file for complete search history.

(56) References Cited

U.S. PATENT DOCUMENTS

| | | | |
|---|---|---|---|
| 7,707,232 | B2 | 4/2010 | Dussud et al. |
| 8,171,254 | B2 | 5/2012 | Takamiya et al. |
| 8,238,157 | B1 * | 8/2012 | Sommer ............ G11C 11/5628 365/185.03 |
| 8,553,466 | B2 | 10/2013 | Han et al. |
| 8,559,235 | B2 | 10/2013 | Yoon et al. |
| 8,626,986 | B2 | 1/2014 | Wu et al. |
| 8,654,587 | B2 | 2/2014 | Yoon et al. |
| 8,745,309 | B2 | 6/2014 | Jung et al. |
| 8,769,191 | B2 | 7/2014 | Yun et al. |
| 2006/0259528 | A1 | 11/2006 | Dussud et al. |
| 2008/0034174 | A1 | 2/2008 | Traister et al. |
| 2008/0189485 | A1 | 8/2008 | Jung et al. |
| 2009/0121271 | A1 | 5/2009 | Son et al. |
| 2011/0191566 | A1 | 8/2011 | Takamiya et al. |
| 2011/0216603 | A1 | 9/2011 | Han et al. |
| 2011/0233648 | A1 | 9/2011 | Seol et al. |
| 2012/0005405 | A1 | 1/2012 | Wu et al. |
| 2012/0051143 | A1 | 3/2012 | Yoon et al. |
| 2012/0054414 | A1 * | 3/2012 | Tsai .................... G06F 12/0246 711/103 |
| 2012/0191936 | A1 | 7/2012 | Ebsen et al. |
| 2013/0117501 | A1 | 5/2013 | Yun et al. |
| 2013/0173875 | A1 | 7/2013 | Kim et al. |
| 2013/0279262 | A1 | 10/2013 | Yoon et al. |
| 2014/0029341 | A1 * | 1/2014 | In ........................ G06F 12/0246 365/185.12 |
| 2014/0195725 | A1 * | 7/2014 | Bennett ............... G06F 12/0246 711/103 |
| 2014/0355347 | A1 * | 12/2014 | Shur ...................... G11C 16/16 365/185.11 |
| 2015/0127887 | A1 * | 5/2015 | Kim ........................ G11C 5/143 711/103 |
| 2015/0212751 | A1 * | 7/2015 | Shi ........................ G06F 3/0623 711/103 |
| 2015/0324282 | A1 * | 11/2015 | Seekins ................... G06F 12/02 714/6.11 |
| 2015/0370701 | A1 * | 12/2015 | Higgins .............. G06F 12/0253 711/103 |

\* cited by examiner

FIG. 5

Table

| BLK # | Disturb index | 1st interval | 2nd interval | Threshold time for 2nd interval |
|---|---|---|---|---|
| 1 | $Z_1$ | $X_1$ | $Y_1$ | $Tth_1$ |
| 2 | $Z_2$ | $X_2$ | $Y_2$ | $Tth_2$ |
| 3 | $Z_3$ | $X_3$ | $Y_3$ | $Tth_3$ |
| ⋮ | ⋮ | ⋮ | ⋮ | ⋮ |
| n | $Z_n$ | $X_n$ | $Y_n$ | $Tth_n$ |

FIG. 8

Table

| BLK # | 2nd interval | Threshold time for 2nd interval |
|---|---|---|
| 1 | $Y_1$ | $Tth_1$ |
| 2 | $Y_2$ | $Tth_2$ |
| 3 | $Y_3$ | $Tth_3$ |
| ⋮ | ⋮ | ⋮ |
| n | $Y_n$ | $Tth_n$ |

DATA STORAGE DEVICE INCLUDING NONVOLATILE MEMORY DEVICE AND OPERATING METHOD THEREOF

CROSS-REFERENCE TO RELATED APPLICATIONS

This applications claims priority under 35 U.S.C. §119 to U.S. Provisional Application No. 62/064,093 filed Oct. 15, 2014, and Korean Patent Application No. 10-2014-0163396 filed Nov. 21, 2014, the entire contents of each of which are hereby incorporated by reference.

BACKGROUND

The present disclosure relates to a semiconductor memory device, and more particularly, to a data storage device including a nonvolatile memory device and/or an operating method thereof.

A semiconductor memory device may be volatile or nonvolatile. A volatile semiconductor memory device may support fast read and write speeds, but it loses contents stored therein when powered off. A nonvolatile semiconductor memory device retains contents stored therein, although its power is cut off. The nonvolatile semiconductor memory device, thus, is used to store data to be retained regardless of whether a power is supplied to the nonvolatile semiconductor memory device.

Nonvolatile memory devices may perform an erase operation before a program operation and may not support an overwrite operation. Garbage collection may be performed due to the characteristics of nonvolatile memory devices. The garbage collection may be an operation for generating a free block through the following operations: selecting a victim block, copying valid pages of the victim block into a free block, erasing the victim block, and assigning the erased block to a free block.

Upon performing the garbage collection, a memory block that includes the most number of invalid pages may be selected as a victim block. However, in a three-dimensional nonvolatile memory device, where cell strings are formed in a direction perpendicular to a substrate, various characteristics of a fabrication process makes it difficult to obtain reliability upon storing data. Thus, garbage collection may be executed differently in a three-dimensional nonvolatile memory device.

SUMMARY

Example embodiments of inventive concepts provide a data storage device to execute a garbage collection operation using a disturbance index, thereby improving the reliability of the data storage device.

According to example embodiments of inventive concepts, a method of operating a data storage device is provided. The data storage device includes a nonvolatile memory device and a memory controller configured to control the nonvolatile memory device. The nonvolatile memory device includes a plurality of memory blocks on a substrate. The memory blocks each include a plurality of cell strings on the substrate. The strings are formed in a direction perpendicular to the substrate. The method includes programming N memory blocks with dummy data, from among the memory blocks of the nonvolatile memory device, at a point in time when a reference time elapses from a point in time when each of the memory blocks is physically erased, acquiring a first interval and a second interval from each of the N memory blocks, calculating a disturb index for each of the N memory blocks, selecting a victim block from among the N memory blocks for garbage collection based on the disturb index, and copying valid page data of the victim block into a free block among the memory blocks. Before being programmed with the dummy data, the N memory blocks are not fully programmed with user data, dummy data, or the user and dummy data. N is an integer greater than 1 and less than a number of the plurality of memory blocks in the nonvolatile memory device. The first interval is defined by the point in time when each of the N memory blocks is physically erased and a point in time when each of the memory blocks is fully programmed. The second interval is an interval during which a fully programmed state is maintained in the N memory blocks after a point in time when each of the N memory blocks is fully programmed. A value of the disturb index increases as the first interval increases and as the second interval decreases.

In example embodiments, the selecting the victim block may include determining whether a value of the disturb index is "0" for at least one of the N memory blocks.

In example embodiments, the selecting the victim block may include first selecting memory blocks having disturb index values of "0" as eligible victim blocks from among the N memory blocks.

In example embodiments, the selecting the victim block may include determining the victim block based on one of the N memory blocks that has the most number of invalid pages, from among the N memory blocks of which the disturb indexes values are "0".

In example embodiments, a memory block that is not fully programed with user data, dummy data, or the user and dummy data may not be selected as the victim block.

In example embodiments, if none of the N memory blocks have disturb index values that equal 0, the selecting the victim block may include selecting one of the N memory blocks having a lowest value for the disturb index among the N memory blocks.

In example embodiments, the selecting of the victim block may include determining whether a number of invalid pages is greater than a reference value in each of the N memory blocks.

In example embodiments, the selecting the victim block may include selecting a memory block, of which the disturb index is "0", from among memory blocks each have more invalid pages than the reference value as the victim block.

In example embodiments, the calculating of the disturb index may include assigning weights may be respectively added to the first interval and the second interval according to the first interval and the second interval.

In example embodiments, the operating method may further include programming pages of the free block, which are not programmed, with dummy data at a point in time when a reference time elapses from a point in time when the free block is physically erased, if the free block is not fully programmed.

In example embodiments, the operating method may further include programming pages of the free block, which are not programmed, with dummy data, if the free block is not fully programmed and a sudden power-off event or a power-off reset event is issued.

According to example embodiments of inventive concepts, a method of operating a data storage device which includes a three-dimensional nonvolatile memory device having a plurality of memory blocks and a memory controller configured to control the three-dimensional nonvolatile memory device is provided. The operating method includes programming N memory blocks with dummy data at a point in time when a reference time elapses from a point in time when each of the memory blocks is physically erased; acquiring an interval during which a fully programmed state is maintained after each of the N memory blocks is fully programmed; selecting a victim block for garbage collection among the N memory blocks in which the interval when the fully programmed state is maintained exceeds a threshold time; and copying valid page data from the victim block into a free block. The N memory blocks, before being programmed with the dummy data, are not fully programmed with user data, dummy data, or the user and dummy data. N is an integer greater than 1 and less than a number of the plurality of memory blocks.

In example embodiments, a memory block including the most number of invalid pages among the N memory blocks in which the interval when the fully programmed state is maintained exceeds the threshold time may be first selected as the victim block.

In example embodiments, the threshold time may vary with both a point in time when each of the N memory blocks is physically erased and a point in time when each of the N memory blocks is fully programmed.

The operating method may further include programming pages of the free block, which are not programmed, with dummy data at a point in time when a reference time elapses from a point in time when the free block is physically erased, if the free block is not fully programmed.

According to example embodiments of inventive concepts, a data storage device includes a nonvolatile memory device and a memory controller. The nonvolatile memory device includes a plurality of memory blocks each having a plurality of word lines and a plurality of bit lines, each bit line being connected with a plurality of cell strings formed in a direction perpendicular to a substrate. The memory controller is configured to program memory blocks, not fully programmed with user data, dummy data, or the user and dummy data, from among the memory blocks, at a point in time when a reference time elapses from a point in time when each of the memory blocks is physically erased, to acquire a first interval and a second interval, the first interval being defined by a point in time when each of the memory blocks is physically erased and a point in time when each of the memory blocks is fully programmed and the second interval being an interval during which a fully programmed state is maintained after a point in time when each of the memory blocks is fully programmed, to calculate a disturb index based on the first interval and the second interval, a value of the disturb index increasing as the first interval increases and as the second interval decreases, to select a victim block for garbage collection based on the disturb index, and to copy valid page data of the victim block into a free block.

In example embodiments, the memory controller may be further configured to determine whether a value of the disturb index is "0". The memory controller may first select memory blocks of which the disturb indexes have a value of "0" as victim blocks, as a result of the determination.

In example embodiments, the memory controller may first select a memory block having the most number of invalid pages from among the memory blocks of which the disturb indexes have a value of "0", as the victim block.

In example embodiments, the memory controller may not select a memory block that is not fully programed with user data, dummy data, or the user and dummy data, as the victim block.

In example embodiments, the memory controller may program pages of the free block, which are not programmed, with dummy data at a point in time when a reference time elapses from a point in time when the free block is physically erased, if the free block is not fully programmed.

According to example embodiments, a method of operating a data storage device is provided. The data storage device includes a nonvolatile memory device and a controller configured to control the nonvolatile memory device. The nonvolatile memory device may include a plurality of memory blocks on a substrate. The method may include performing a dummy closing operation on N memory blocks that are not fully programmed among the plurality of memory blocks, N being an integer greater than 1 and less than a number of the plurality of memory blocks, the dummy closing operating including programming the N memory blocks with dummy data at respective times corresponding to first intervals after respective erase times for each of the N memory blocks; selecting a victim block among the N memory blocks based on one of a second interval and a disturb index for each of the N memory blocks; and performing garbage collection on the victim block. The second intervals correspond to respective times in which each of the N memory blocks is maintained in a fully-programmed state after the performing the dummy closing operation. The disturb index is calculated by the controller for each of the N memory blocks based on the first and second intervals of the N memory blocks.

In example embodiments, the selecting the victim block may include determining whether a value of the disturb index is 0 for at least one of the N memory blocks, and selecting the victim block based on one of (i) first selecting memory blocks having disturb indexes of 0 as eligible victim blocks among the N memory blocks and determining the victim block based on one of the eligible victims blocks that has the most invalid pages, and (ii) selecting one of the N memory blocks having a lowest disturb index as the victim block if none of the N memory blocks have disturb indexes of 0.

In example embodiments, the selecting the victim block may include first selecting memory blocks having second intervals greater than a threshold value as eligible victim blocks, and selecting one of the eligible victim blocks that has a greatest number of invalid pages among the eligible victim blocks as the victim block.

In example embodiments, the selecting the victim block may include determining whether each of the N memory blocks includes a number of invalid pages that is greater than a threshold value, and one of (i) randomly selecting the victim block among the N memory blocks that include more invalid pages than the threshold value, and (ii) selecting one of the N memory blocks that has a smallest value for the disturb index if each of the N memory blocks has few invalid pages than the threshold value.

In example embodiments, the nonvolatile memory device may be a three-dimensional nonvolatile memory device. The plurality of memory blocks may each include a plurality of strings on the substrate. The plurality of strings may each have one of a U-shaped pillar and a vertical pillar.

BRIEF DESCRIPTION OF THE FIGURES

The foregoing and other features of inventive concepts will be apparent from the more particular description of non-limiting embodiments of inventive concepts, as illustrated in the accompanying drawings in which like reference characters refer to like parts throughout the different views.

The drawings are not necessarily to scale, emphasis instead being placed upon illustrating principles of inventive concepts. In the drawings:

FIG. 5 is a table according to example embodiments of inventive concepts;

FIG. 8 is a diagram showing a table according to example embodiments of inventive concepts;

DETAILED DESCRIPTION

Figure 1:
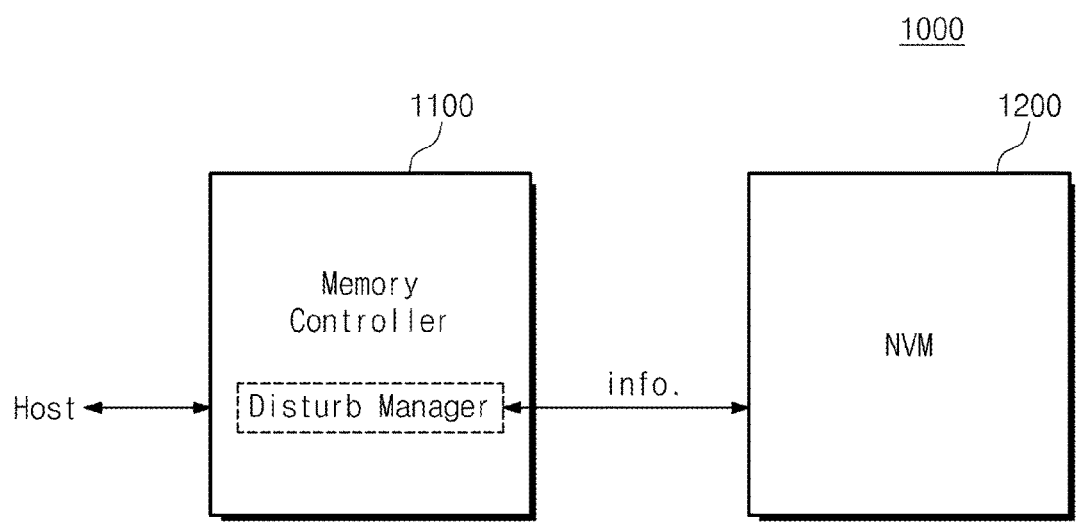
FIG. 1 is a block diagram schematically illustrating a data storage device according to example embodiments of inventive concepts.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted. Accordingly, known processes, elements, and techniques may not be described with respect to example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration. Expressions such as "at least one of," when preceding a list of elements, modify the entire list of elements and do not modify the individual elements of the list.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array.

In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

FIG. 1 is a block diagram schematically illustrating a data storage device according to example embodiments of inventive concepts. Referring to FIG. 1, a data storage device 1000 may include a memory controller 1100 and a nonvolatile memory device 1200.

The memory controller 1100 may respond to a request from a host to write data at the nonvolatile memory device 1200 or to read data stored at the nonvolatile memory device 1200. The memory controller 1100 may provide the nonvolatile memory device 1200 with an address ADDR, a command CMD, and a control signal CTRL to write data at the nonvolatile memory device 1200.

According to example embodiments of inventive concepts, the memory controller 1100 may manage a first interval and a second interval that are associated with each memory block of the nonvolatile memory device 1200. In example embodiments, the first interval may mean an interval between a point in time when a memory block is physically erased and a point in time (hereinafter referred to as "fully-programmed point in time") when the whole memory block is fully programmed. The second interval may be defined as an interval during which a programmed state is maintained after the fully-programmed point in time. The memory controller 1100 may calculate a disturb index where the first interval and the second interval are used as independent variables.

Meanwhile, a usable space of the data storage device 100 may be restricted. Thus, the memory controller 1100 may execute a garbage collection operation with respect to the nonvolatile memory device 1200 to utilize a storage space of the data storage device 1000 efficiently. The memory controller 1100 may execute a garbage collection operation with respect to the nonvolatile memory device 1200, based on a disturb index that is calculated using the first interval and the second interval. Also, the memory controller 1100 may execute a garbage collection operation with respect to the nonvolatile memory device 1200, based on the second interval. The reliability of the data storage device 1000 may be improved by performing the garbage collection operation using the disturb index or the second interval. This will be more fully described with reference to accompanying drawings.

Figure 2:
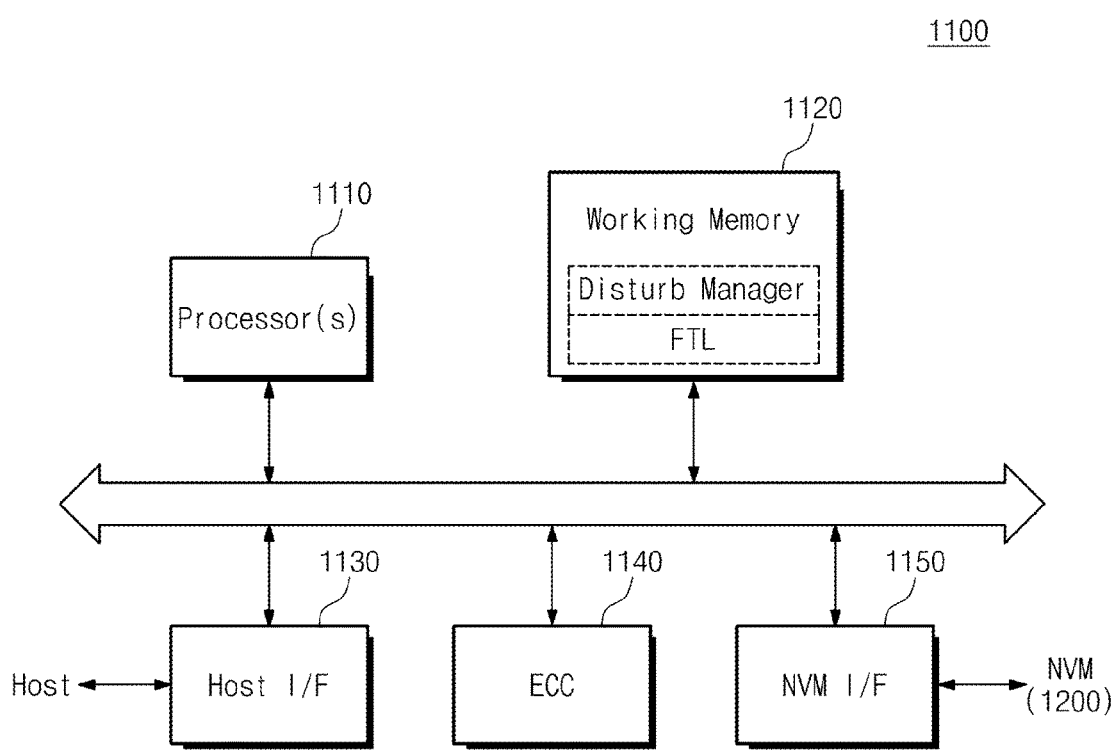
FIG. 2 is a block diagram schematically illustrating a memory controller shown in FIG. 1.

FIG. 2 is a block diagram schematically illustrating a memory controller shown in FIG. 1. Referring to FIG. 2, a memory controller 1100 may contain one or more processors 1110, a working memory 1120, a host interface 1130, an ECC circuit 1140, and a nonvolatile memory interface 1150. The processors 1110, working memory 1120, host interface 1130, ECC circuit 1140, and nonvolatile memory interface 1150 may communicate through a bus 1160. However, inventive concepts are not limited thereto. For example, the nonvolatile memory device 1100 may further include a ROM that is used to store code data needed to perform a booting operation.

The processor 1110 may control an overall operation of the memory controller 1100. The processor 1110 may drive firmware for driving the memory controller 1100. The firmware may be loaded and driven on the working memory 1120. The firmware may include a disturb manager and a flash translation layer (FTL).

The working memory 1120 may be used to load software and firmware for controlling the memory controller 1100. The working memory 1120 may include at least one of a cache memory, a DRAM, an SRAM, a phase-change RAM (PRAM), or a flash memory device. In example embodiments, the disturb manager and the flash translation layer FTL may be loaded on the working memory 1120.

The host interface 1130 may provide an interface between a host and the memory controller 1100. The host and the memory controller 1100 may be connected through at least one of various standardized interfaces including the following: ATA (Advanced Technology Attachment), SATA (Serial ATA), e-SATA (external SATA), SCSI (Small Computer Small Interface), SAS (Serial Attached SCSI), PCI (Peripheral component Interconnection), PCI-E (PCI Express), USB (Universal Serial Bus), IEEE 1394, and Card.

The ECC circuit 1140 may generate an error correction code ECC for correcting a fail bit or an error bit of data received from a nonvolatile memory device 1200. The ECC circuit 1140 may encode data to be provided to the nonvolatile memory device 1200 to generate data to which parity information is added to the data. The parity information may be stored at the nonvolatile memory device 1200. The nonvolatile memory device 1200 may be a flash memory device.

The nonvolatile memory interface 1150 may provide an interface between the memory controller 1100 and the nonvolatile memory device 1200. For example, the memory controller 1100 may exchange data with the nonvolatile memory device 1200 through the nonvolatile memory interface 1150.

Figure 3:
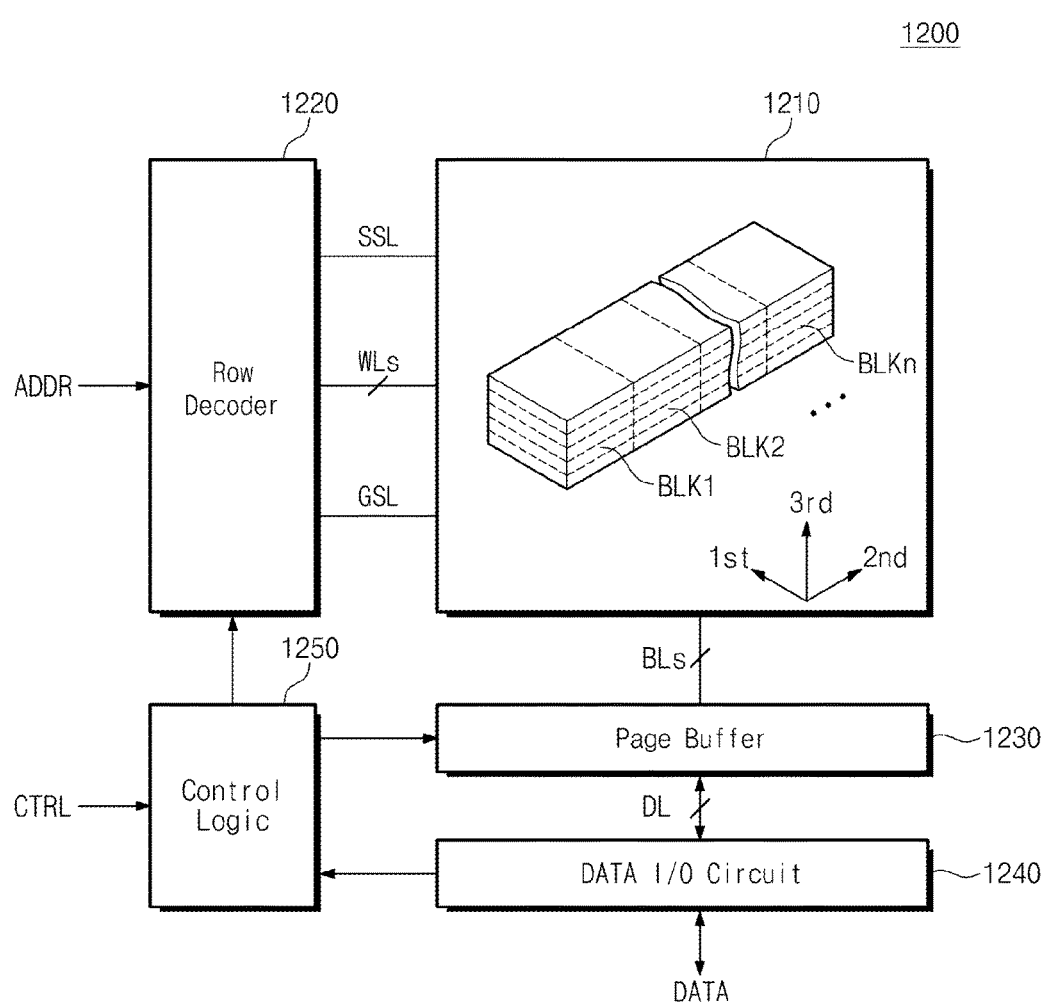
FIG. 3 is a block diagram schematically illustrating a nonvolatile memory device shown in FIG. 1.

FIG. 3 is a block diagram schematically illustrating a nonvolatile memory device shown in FIG. 1. Referring to FIG. 3, a nonvolatile memory device 1200 may contain a memory cell array 1210, a row decoder 1220, a page buffer circuit 1230, a data input/output circuit 1240, and a control logic circuit 1250.

The memory cell array 1210 may contain a plurality of memory blocks BLK1 through BLKn. Memory cells of each memory block may be formed to have a three-dimensional structure where the memory cells are stacked in a direction perpendicular to a substrate. Each of the memory cells may be configured to store one or more data bits The row decoder 1220 may select of the memory blocks in response to a row address. The row decoder 1220 may provide word lines with the following word line voltages needed for driving: program voltage, pass voltage, erase voltage, verification voltage, read voltage, and read pass voltage.

The page buffer circuit 1230 may operate as a write driver or a sense amplifier according to a mode of operation. For example, at a read operation, the page buffer circuit 1230 may operate as the sense amplifier. At a write operation, the page buffer circuit 1230 may operate as the write driver. The page buffer circuit 1230 may include a plurality of page buffers that correspond to a plurality of bit lines, respectively.

The data input/output circuit 1240 may select page buffers of the page buffer circuit 1230 in response to a column address. At a program operation, program bits provided through the data input/output circuit 1240 may be stored at selected page buffers. At a read operation, data of selected page buffers may be output to an external device through the data input/output circuit 1240.

The control logic circuit 1250 may control the row decoder 1220, the page buffer circuit 1230, and the data input/output circuit 1240 in response to received command CMD and control signal CTRL. For example, the control logic circuit 1250 may control the row decoder 1220, the page buffer circuit 1230, and the data input/output circuit 1240 in response to a command CMD and a control signal CTRL such that data is programmed at the memory cell array 1210. Alternatively, the control logic circuit 1250 may control the row decoder 1220, the page buffer circuit 1230, and the data input/output circuit 1240 in response to a command CMD and a control signal CTRL such that data programmed at the memory cell array 1210 is output.

Figure 4:
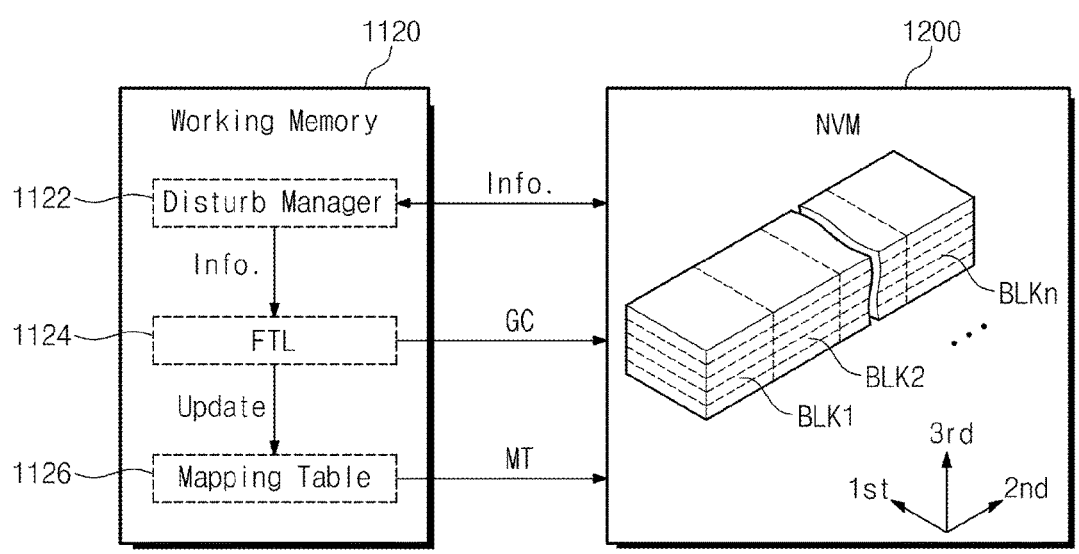
FIG. 4 is a block diagram schematically illustrating a multilayered software (or, firmware) architecture of a memory controller according to example embodiments of inventive concepts.

FIG. 4 is a block diagram schematically illustrating a multilayered software (or, firmware) architecture of a memory controller according to example embodiments of inventive concepts. Referring to FIG. 4, software (or, firmware) of a memory controller may include a flash translation layer 1124 and a mapping table 1126, which are loaded onto a working memory 1120 of the memory controller. In FIG. 4, a non-limiting example of inventive concepts is shown where the mapping table 1126 is loaded as separate software (or, firmware). However, the mapping table 1126 may be incorporated in a function of the flash translation layer 1124.

A disturb manager 1122 may manage a first interval and a second interval that are associated with each of memory blocks BLK1 through BLKn of a nonvolatile memory device 1200. The disturb manager 1122 may manage (and/or determine) a disturb index that is calculated based on the first interval and the second interval. The disturb manager 1122 may manage such information in real time. The disturb manager 1122 may periodically store the first interval, the second interval, and the disturb index at a Meta area (not shown) of the nonvolatile memory device 1200. The meta area where such pieces of information are stored may be formed of the whole or a part of at least a block of the nonvolatile memory device 1200.

The flash translation layer 1124 may perform a garbage collection operation where valid data stored at victim blocks of the nonvolatile memory device 1200 is gathered and the gathered valid data is copied into a free block. According to example embodiments of inventive concepts, the garbage collection operation may be carried out based on the disturb index. For example, the disturb index may be a function that uses the first interval and the second interval as independent variables. A value of the disturb index may increase as the first interval becomes longer and may decrease as the second interval becomes shorter. Upon executing the garbage collection operation, a memory block of which the disturb index is "0" or is smallest may be selected as a victim block. As another example, upon executing the garbage collection operation, a memory block that has the second interval longer than or equal to a threshold value may be selected as a victim block. The mapping table 1126 may be updated according to the garbage collection operation.

The mapping table 1126 may include information associated with correspondence between logical addresses and physical addresses of data stored at the nonvolatile memory device 1200. The mapping table 1126 may be loaded from the meta area of the nonvolatile memory device 1200. The mapping table 1126 may be managed on the working memory 1120 in real time and may be periodically stored at the metal area of the nonvolatile memory device 1200.

According to example embodiments of inventive concepts, the garbage collection operation may be performed based on the disturb index or the second interval, not based on the number of invalid pages of memory blocks or wear-leveling. Thus, it is possible to improve the reliability of a data storage device.

FIG. 5 is a table according to example embodiments of inventive concepts. As illustrated in FIG. 5, a table may include plural pieces of information that are associated with a disturb index, a first interval, a second interval, and a threshold time Tth of each memory block. As described above, the first interval may be an interval between a point in time when each memory block is physically erased and a fully-programmed point in time, and the second interval may be defined as an interval where a programmed state is maintained after each memory block is fully programmed. The threshold time Tth may mean the second interval that is required according to the first interval. That a memory block is fully programmed may mean that the whole memory block is programmed with user data, dummy data, or user and dummy data.

The disturb index may be expressed as a function that uses the first interval and the second interval as independent variables. A value of the disturb index may increase as the first interval becomes longer and may decrease as the second interval become shorter. The following equation 1 shows an example of the disturb index.

$$Z=(a\times X)-(b\times Y) \quad (1)$$

In the equation 1, "a" and "b" are positive integers. Values of "a" and "b" may be the same or different. Values of the constants "a" and "b" may vary with values of "X" and "Y". That is, weights may be added to values of the "X" and "Y", based on magnitudes of the "X" and "Y". For example, as the first interval becomes longer, a value of the weight "b" added to the second interval may become greater. As the second interval becomes longer, a value of the weight "b" added to the second interval may become smaller. Values of the constants "a" and "b" may be adjusted such that a value of the disturb index is greater than or equal to "0". Even though the second interval converges into infinity, a value of the weight "b" may be adjusted such that the disturb index has a value of "0". However, the disturb index may not be limited to the equation 1. As expressed by the following equation 2 or 3, a value of the disturb index may increase as the first interval becomes longer and as the second interval becomes shorter.

$$Z=(a\times X^2)-(b\times Y^2) \quad (2)$$

$$Z=\frac{a\times X}{b\times Y} \quad (3)$$

In the equations 2 and 3, as described above, values of the constants "a" and "b" may be adjusted.

Figure 6A:
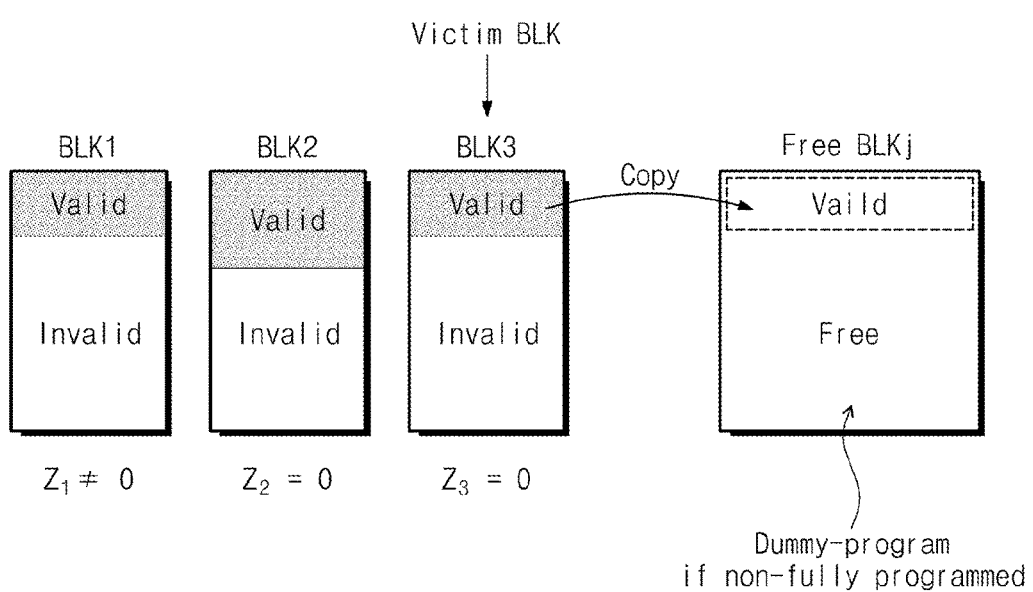
FIG. 6A is a block diagram schematically illustrating a garbage collection operation according to example embodiments of inventive concepts.

FIG. 6A is a block diagram schematically illustrating a garbage collection operation according to example embodiments of inventive concepts. A table may be managed by a disturb manager 1122 shown in FIG. 4 and may be periodically stored at a meta-area of a memory block 1200 (refer to FIG. 4). For the sake of easy understanding, inventive concepts will be described with reference to memory blocks BLK1 through BLK3.

Before a garbage collection operation is performed, a dummy closing operation (e.g., the dummy closing operation may mean programming with dummy data) may be performed with respect to memory blocks where data is stored. For example, data may be stored in N memory blocks. N may be an integer greater than or equal to 1 and less than or equal to a total number of the memory blocks. In FIG. 6A, a non-limiting example is described where N equals 3 memory blocks where data is stored, but example embodiments are not limited thereto. The dummy closing operation may be executed with respect to a memory block that is not fully programmed with user data, dummy data, or user and dummy data. The dummy closing operation may be determined based on whether a reference point in time corresponding to a desired (and/or alternatively predetermined) threshold time Tth of a memory block elapses. For example, assuming that the memory block BLK1 is managed to have a threshold time of "Tth1", the dummy closing operation may be performed at a point in time when a first interval of the memory block BLK1 becomes X1. The memory blocks BLK1 through BLK3 may be fully programmed through the dummy closing operation.

Alternatively, the dummy closing operation may be performed with respect to a memory block after any point in time elapses, and a programmed state may be maintained during a threshold time corresponding to a first interval of the dummy closed memory block. For example, it is assumed that the memory block BLK1 is not fully programmed with user data, dummy data, or user and dummy data and the dummy closing operation is performed at any point in time because the memory block BLK1 is not fully programmed even after a constant time elapses. At this time, the first interval X1 may be defined by an interval between a point in time when the memory block BLK1 is physically erased and a point in time when the dummy closing operation is completed. On this occasion, the memory block BLK1 may be managed such that a programmed state is maintained during a threshold time Tth1 corresponding to the first interval X1.

A victim block that corresponds to a garbage collection target may be selected after the dummy closing operation is performed. As described with reference to the equation 1, a disturb index of each of the memory blocks BLK1 through BLK3 may be calculated to select a victim block. As illustrated in FIG. 6A, it is assumed that a value of the disturb index of the memory block BLK1 is not "0" and a value of the disturb index of each of the memory blocks BLK2 and BLK3 is "0". This may mean that a sufficient time (e.g., a threshold time Tth1 shown in FIG. 5) does not elapse after the memory block BLK1 is fully programmed and that a sufficient time (e.g., threshold times Tth2 and Th3 shown in FIG. 5) elapses after the memory blocks BLK2 and BLK3 are fully programmed. The memory block BLK1 of which the disturb index value is not 0 may be first excluded from a victim block as a garbage collection target. A memory block that is not fully programmed with user data, dummy data, or user and dummy data may be excluded from a victim block. In some cases, a memory block that does not suffer the dummy closing operation may exist even before a garbage collection operation is not performed.

Selected as a victim block is the memory block BLK3, having the most number of invalid pages, from among memory blocks each having a disturb index of "0". At this time, invalid pages may include a page of which the information is deleted (e.g., logically erased) from a mapping table through a flash translation layer and a page at which dummy data is programmed. However, a physically erased page may be included in the invalid pages. That is, a memory block that includes a page not fully programmed with user data or dummy data may be excluded from a victim block. In FIG. 6A, a non-limiting example is shown where the memory block BLK3 having the most number of invalid pages is selected as a victim block. However, the number of victim blocks may be in plurality, and the victim blocks may be selected in descending order of values of disturb indexes.

Data that is stored at the memory block BLK3 selected as a victim block may be copied into a free block BLKj. At this time, data stored at the victim block BLK3 may be physically erased.

Meanwhile, a first interval Xj may elapse from a point in time when the free block BLKj is physically erased. When the free block BLKj is fully programmed, the first interval Xj may be from a point in time when the free block BLKj is physically erased to a point in time when it is fully programmed. This case may not be problematic, but a problem may arise when the first interval Xj proceeds with the free block BLKj not fully programmed.

A dummy programming operation may be performed with respect to the free block BLKj when the free block BLKj is not fully programmed and includes a page(s) not programmed. The dummy programming operation may be executed according to the above-described dummy closing operation. Alternatively, as an exception, the dummy programming operation may be performed at sudden power-off or when power-off reset (POR) is invoked by a user. That is, instead of neglecting the event that a first interval becomes infinite, when a condition such as power-off is issued, pages of the free block BLKj that are not programmed may be programmed with dummy data. The first interval Xj of the free block BLKj may be set to an interval between a point in time when the free block BLKj is physically erased and a point in time when the dummy programming operation is completed.

Figure 6B:
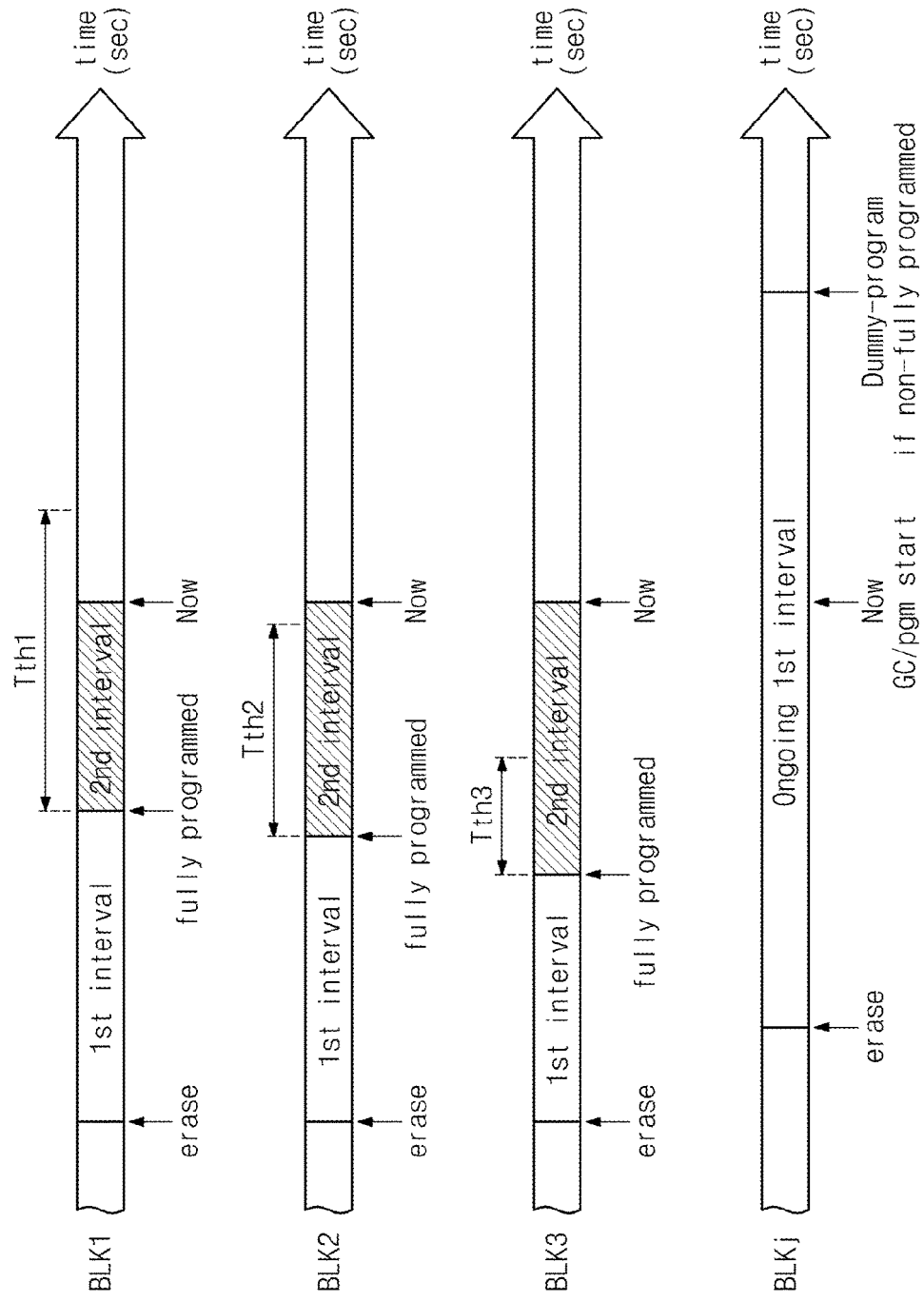
FIG. 6B is a diagram showing states of memory blocks shown in FIG. 6A with the lapse of time.

FIG. 6B is a diagram showing states of memory blocks shown in FIG. 6A with the lapse of time. For the sake of easy understanding, it is assumed that memory blocks BLK1 through BLK3 are first erased at the same time.

Afterwards, the memory blocks BLK1 through BLK3 may be fully programmed at any points in time. At this time, each memory block may be fully programmed with user data or may be programmed with dummy data according to a dummy-closing policy. The dummy-closing policy is described with reference to a memory block BLK1 in FIG. 6B.

As illustrated in FIG. 6B, a first interval may be defined based on a point in time when each memory block is physically erased and a point in time when each memory block is fully programmed. A second interval may be defined based on a point in time when each memory block is fully programmed and a current point in time (see Now in FIG. 6B). The memory block BLK1 may be first excluded because memory blocks of which the threshold times Tth varying with the first interval elapse are selected as victim blocks. In other words, the second interval for the memory block BLK1 at the point in time Now may not have yet elapsed past the threshold time Tth1. Even though threshold times Tth2 and Tth3 of the memory blocks BLK2 and BLK3 all elapse, the memory block BLK3 may be selected as a victim block because the memory block BLK3 includes relatively many invalid pages. In other words, the memory block BLK3 may include more invalid pages than the memory block BLK2.

Meanwhile, the first interval may proceed from a point in time when a free block BLKj is physically erased. At a garbage collection operation, data of the victim block (e.g., memory block BLK3) may be copied into the free block BLKj. When a free block is not fully programmed with user data, dummy data, or user and dummy data, it may be programmed with dummy data according to the above-described dummy-closing operation. As an exception, the dummy programming operation may be performed under a desired (and/or alternatively predetermined) condition (e.g., sudden power-off or POR) to (limit and/or prevent) the first interval from proceeding.

Figure 7:
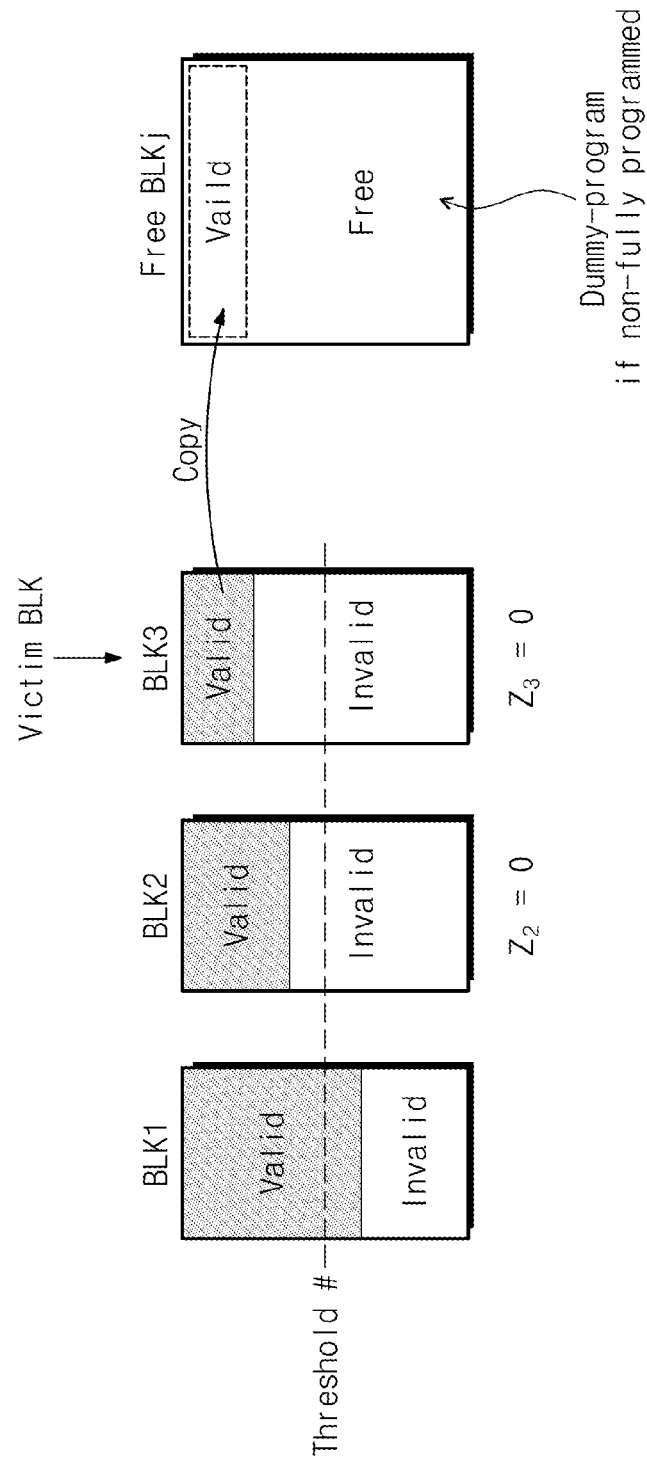
FIG. 7 is a block diagram schematically illustrating a garbage collection operation according to example embodiments of inventive concepts.

FIG. 7 is a block diagram schematically illustrating a garbage collection operation according to example embodiments of inventive concepts. For the sake of easy understanding, memory blocks BLK1 through BLK3 will be only considered.

Prior to a garbage collection operation, a dummy closing operation may be performed with respect to memory blocks at which data is stored. The memory block BLK1 through BLK3 all may be fully programmed according to the dummy closing operation. The dummy closing operation is described above, and a repeat description thereof is thus omitted.

To select a victim block corresponding to a garbage collection target, there may be determined whether the number of invalid pages of each memory block is more than or equal to a threshold value Threshold #. The invalid pages may include both a logically erase page and a page programmed with dummy page, but they may not include a physically erased page. That is, a memory block that includes a page(s) not fully programmed with user data or dummy data may be excluded from a victim block. A memory block BLK1 in which the number of invalid pages is less than the threshold value Threshold # may be exclude from the victim block, regardless of whether a value of a disturb index is "0".

Selected as a victim block is the memory block BLK3, having the most number of invalid pages, from among the memory blocks BLK2 and BLK3 in which the number of invalid pages is more than or equal to the threshold value Threshold #.

In FIG. 7, a non-limiting example is shown where the memory block BLK3 having the most number of invalid pages is selected as a victim block. However, the number of victim blocks may be in plurality, and the victim blocks may be selected in descending order of values of disturb indexes.

Data that is stored at the memory block BLK3 selected as a victim block may be copied into a free block BLKj. At this time, data stored at the victim block BLK3 may be physically erased.

Meanwhile, a first interval Xj may proceed from a point in time when the free block BLKj is physically erased. At a garbage collection operation, data of the memory block BLK3 may be copied into the free block BLK3. The free block BLKj may be programmed with dummy data according to the above-described dummy closing operation when the free block BLKj is not fully programmed with user data, dummy data, or user data and dummy data. Alternatively, as an exception, the dummy programming operation may be performed under a desired (and/or alternatively predetermined) condition (e.g., sudden power-off or POR) to (limit and/or prevent) the first interval from proceeding.

According to example embodiments of inventive concepts, unlike a typical garbage collection operation, a garbage collection operation may be performed based on a disturb index that is calculated based on a first interval and a second interval. Thus, it is possible to improve the reliability of a nonvolatile memory device.

FIG. 8 is a diagram showing a table according to example embodiments of inventive concepts. As illustrated in FIG. 8, a table may include information associated with a second interval and a threshold time of each memory block. According to example embodiments of inventive concepts, the size (e.g., information amount) of the table shown in FIG. 8 may be smaller than that of a table shown in FIG. 5. In case of the table shown in FIG. 8, a disturb index does not need to be calculated. Thus, example embodiments of inventive concepts may be applied to the case that a system resource is relatively insufficient. However, inventive concepts are not limited thereto.

Figure 9:
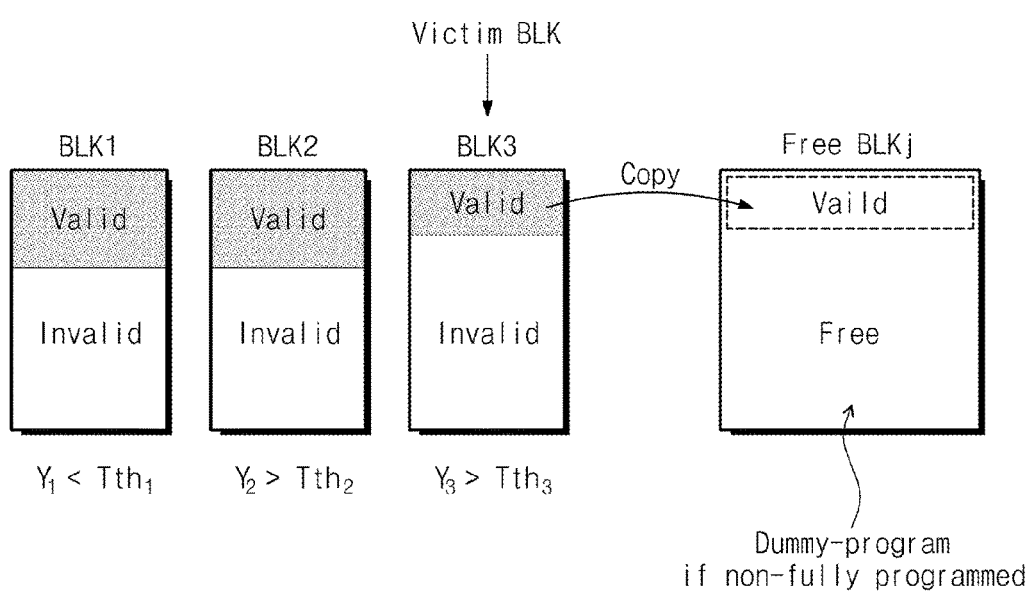
FIG. 9 is a block diagram schematically illustrating a garbage collection operation according to example embodiments of inventive concepts.

FIG. 9 is a block diagram schematically illustrating a garbage collection operation according to example embodiments of inventive concepts. A table may be managed by a disturb manager 1122 shown in FIG. 4 and may be periodically stored at a meta-area of a nonvolatile memory device 1200 (refer to FIG. 4). For the sake of easy understanding, memory blocks BLK1 through BLK3 will be only considered.

Prior to a garbage collection operation, a dummy closing operation may be performed with respect to memory blocks at which data is stored. The memory block BLK1 through BLK3 all may be fully programmed according to the dummy closing operation. The dummy closing operation is in detail described above, and a duplicated description thereof is thus omitted.

Memory blocks BLK1 and BLK3 in which a second interval exceeds a threshold time Tth may be selected to select a victim block corresponding to a garbage collection target. The selected memory blocks may be fully programmed memory blocks.

Selected as a victim block is the memory block BLK3, having the most number of invalid pages, from among the memory blocks BLK2 and BLK3 of which the second intervals are greater than their threshold times Tth.

At this time, the invalid pages may include a logically erased page and a page at which dummy data is programmed. However, a physically erased page may be included in the invalid pages. In FIG. 9, a non-limiting example is shown where the memory block BLK3 including the most number of invalid pages is selected as a victim block. However, the number of victim blocks may be in plurality, and the victim blocks may be selected in descending order of values of disturb indexes.

Data that is stored at the memory block BLK3 selected as a victim block may be copied into a free block BLKj. At this time, data stored at the victim block BLK3 may be physically erased.

Meanwhile, a first interval Xj may proceed from a point in time when the free block BLKj is physically erased. At a garbage collection operation, data of the memory block BLK3 may be copied into the free block BLK3. The free block BLKj may be programmed with dummy data according to the above-described dummy closing operation when the free block BLKj is not fully programmed with user data, dummy data, or user data and dummy data. Alternatively, as an exception, the dummy programming operation may be performed under a desired (and/or alternatively predetermined) condition (e.g., sudden power-off or POR) to (limit and/or prevent) the first interval from proceeding.

Figure 10:
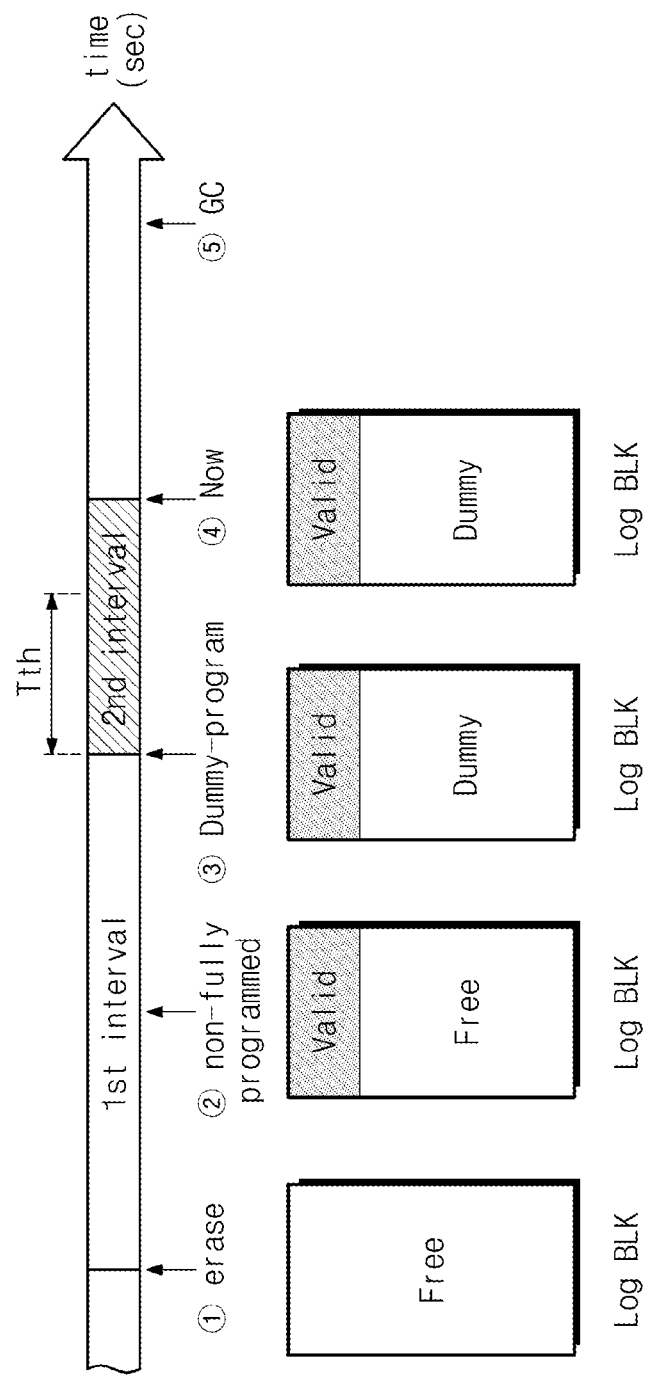
FIG. 10 is a diagram showing a dummy programming operation that is executed with respect to memory blocks before a garbage collection operation is performed.

FIG. 10 is a diagram showing a dummy programming operation that is executed with respect to memory blocks before a garbage collection operation is performed.

Each memory block of a nonvolatile memory device may be physically erased at any point in time (①). A log block shown in FIG. 10 may be a memory block at which data is stored.

The memory blocks may include memory blocks that are not fully programmed with user data, dummy data, or user and dummy data (②).

At a specific point in time, a dummy closing operation may be performed to program memory blocks, which are not fully programmed, with dummy data (③). A point in time when the dummy closing operation is performed may be determined according to a desired (and/or alternatively predetermined) threshold time Tth of a memory block. To maintain data stored at any memory block during at least a threshold time Tth, a dummy programming operation may be performed at a point in time when the first interval corresponding thereto elapses. Alternatively, the dummy programming operation may be executed with respect to a memory block at any point in time, and data may be maintained during a threshold time Tth corresponding to a first interval.

At the same time when a second interval exceeds the threshold time Tth, memory blocks that are fully programmed with user data, dummy data, or user data and dummy data may be considered as victim blocks (⑤).

Figure 11:
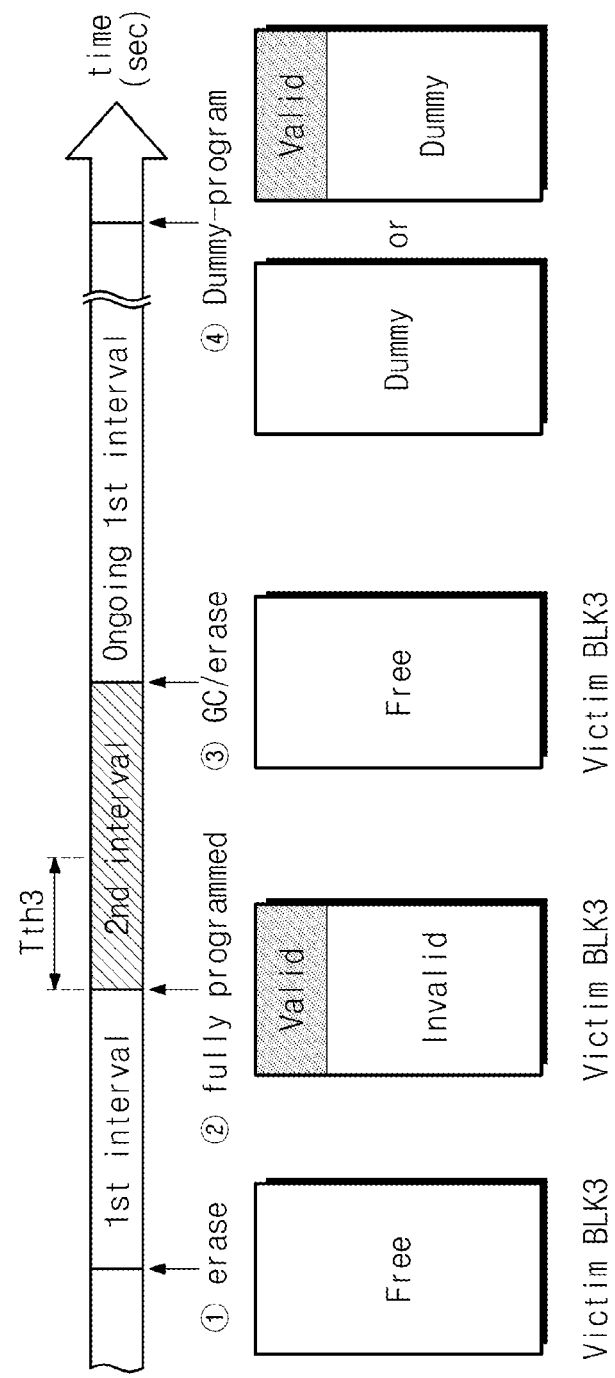
FIG. 11 is a diagram showing how a victim block is programmed with the lapse of time at a garbage collection operation, according to example embodiments of inventive concepts.

FIG. 11 is a diagram showing how a victim block is programmed with the lapse of time at a garbage collection operation, according to example embodiments of inventive concepts.

A victim block BLK3 may be physically erased at any point in time before a garbage collection operation (①). A first interval may elapse from a point in time when the victim block BLK3 is physically erased.

Before the garbage collection operation is performed, the victim block BLK3 may be fully programmed at any point in time. At this time, the victim block BLK3 may include valid pages or invalid pages. The invalid pages may include a logically erased page and a page at which dummy data is programmed. However, a physically erased page may be included in the invalid pages.

When the memory block BLK3 is selected as a victim block at the garbage collection operation, data stored at the victim block BLK3 may be copied into any other free block, and the victim block BLK3 may be physically erased (③). As illustrated in FIG. 11, a second interval may be defined by a point in time (②) when the victim block BLK3 is fully programmed and a point in time (③) when the victim block BLK3 is physically erased. Because the second time of the memory block BLK3 exceeds a threshold time Tth3 that is based on the first interval, as described above, the memory block BLK3 may be selected as a victim block.

The first interval may also elapse from the point in time (③) when the victim block BLK3 is physically erased. A problem may not arise when the victim block BLK3 is fully programmed with user data, dummy data, or user data and dummy data. Otherwise, a problem may arise. In this case, a dummy programming operation may be executed according to the above-described dummy closing policy. Also, as an exception, when an event such as sudden power-off or POR occurs, pages of the victim block BLK3 that are not programmed may be programmed with dummy data (④).

Figure 12:
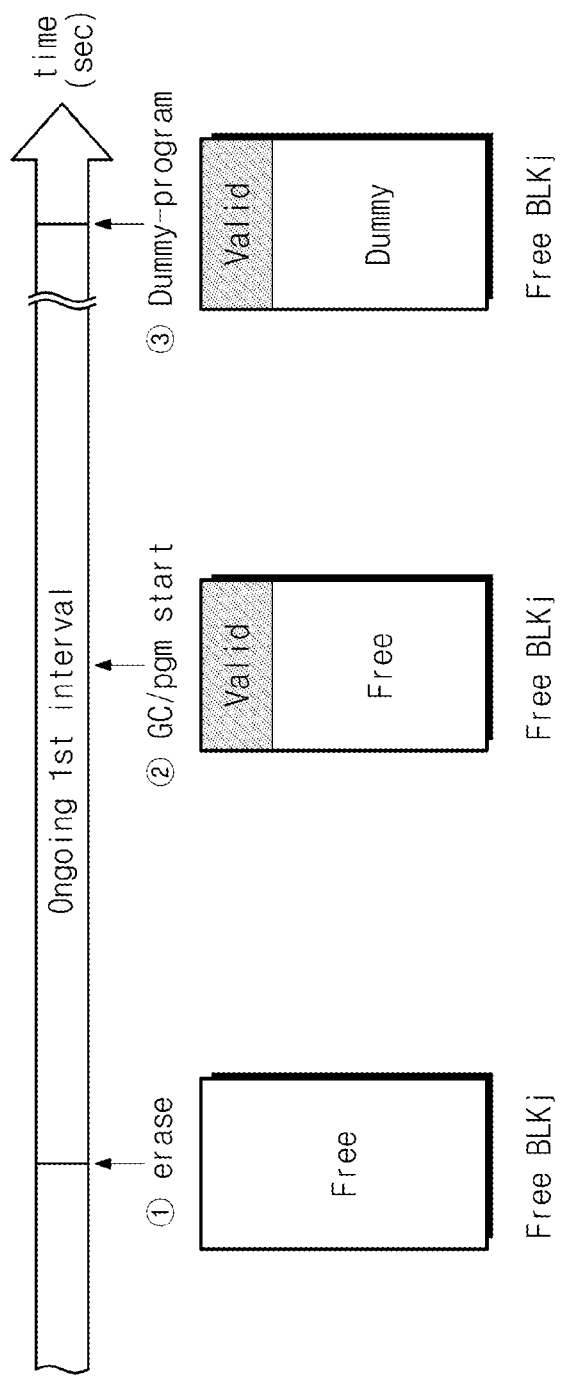
FIG. 12 is a diagram showing how a free block is programmed with the lapse of time at a garbage collection operation, according to example embodiments of inventive concepts.

FIG. 12 is a diagram showing how a free block is programmed with the lapse of time at a garbage collection operation, according to example embodiments of inventive concepts.

A free block BLKj may be physically erased at any point in time before a garbage collection operation (①). A first interval may elapse from a point in time when the free block BLKj is physically erased.

When a garbage collection operation is performed, data stored at a victim block may be copied into the free block BLKj (②). No problem may arise when the free block BLKj is fully programmed with user data, dummy data, or user data and dummy data. Otherwise, a problem may arise. In this case, a dummy programming operation may be executed according to the above-described dummy closing policy. Also, as an exception, when an event such as sudden power-off or POR occurs, pages of the free block BLKj that are not programmed may be programmed with dummy data (③).

According to example embodiments of inventive concepts, unlike a typical garbage collection operation, a garbage collection operation may be performed based on a first interval and a second interval. As described above, when a specific memory block is not fully programmed within a reference time corresponding to a threshold time, it may be fully programmed with dummy data at a point in time when the reference time elapses. Thus, it is possible to improve the reliability of a nonvolatile memory device.

Figure 13:
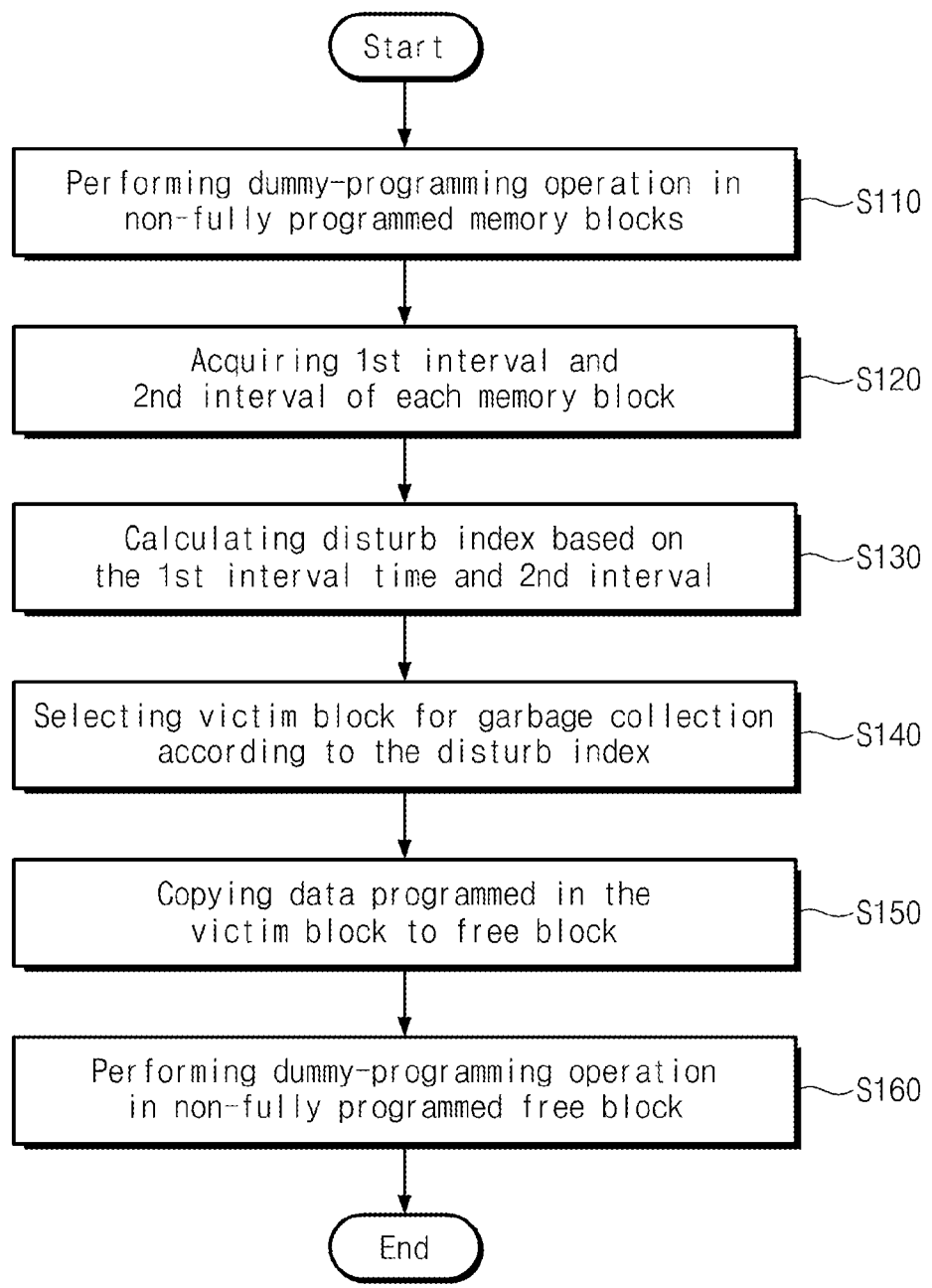
FIG. 13 is a flow chart showing an operating method of a data storage device according to example embodiments of inventive concepts.

FIG. 13 is a flow chart showing an operating method of a data storage device according to example embodiments of inventive concepts.

In step S110, a dummy programming operation may be performed with respect to memory blocks, not fully programmed with user data, dummy data, or user data and dummy data, from among memory blocks. The dummy programming operation may be performed based on whether a reference time corresponding to a threshold time of a memory block elapses. If the dummy programming operation is performed with respect to a specific memory block at a point in time when the reference time elapses, a first interval may be defined by a point in time when the specific memory block is physically erased and a point in time when the reference time elapses. Alternatively, the dummy programming operation may be performed with respect to a memory block after any point in time, and a programmed state may be maintained during a threshold time corresponding to the first interval of a dummy closed memory block.

In step S120, information may be acquired which is associated with a first interval and a second interval of each memory block. The acquired information may be managed by a disturb manager 1122 (refer to FIG. 4) of a memory controller. The acquired information may be periodically stored at a meta-area of a nonvolatile memory device 1200 (refer to FIG. 4). Information that forms the basis of the first interval and the second interval and is associated with a point in time when a final program operation about each memory block is completed may be acquired from a response to a ready/busy signal R/B that a memory controller 1100 (refer to FIG. 1) sends to the nonvolatile memory device 1200.

In step S130, a disturb index may be calculated based on the first interval and the second interval. A value of the disturb index may increase as the first interval becomes longer and may decrease as the second interval decreases. The relation may be expressed using various equations. The disturb index may be managed by the disturb manager 1122 in real time and may be stored at a meta-area of the nonvolatile memory device 1200.

In step S140, a victim block corresponding to a garbage collection target may be selected based on the calculated disturb index.

In step S150, user data stored at the victim block may be copied into a free block. At the same time, user data stored at the victim block may be physically erased.

In step S160, a dummy programming operation may be performed with respect to pages of the free block which are not programmed and pages of other memory blocks, which are not programmed. The dummy programming operation may be performed according to a dummy closing policy. As an exception, the dummy programming operation may be performed at sudden power-off or when a power-off reset (POR) event is issued.

Figure 14:
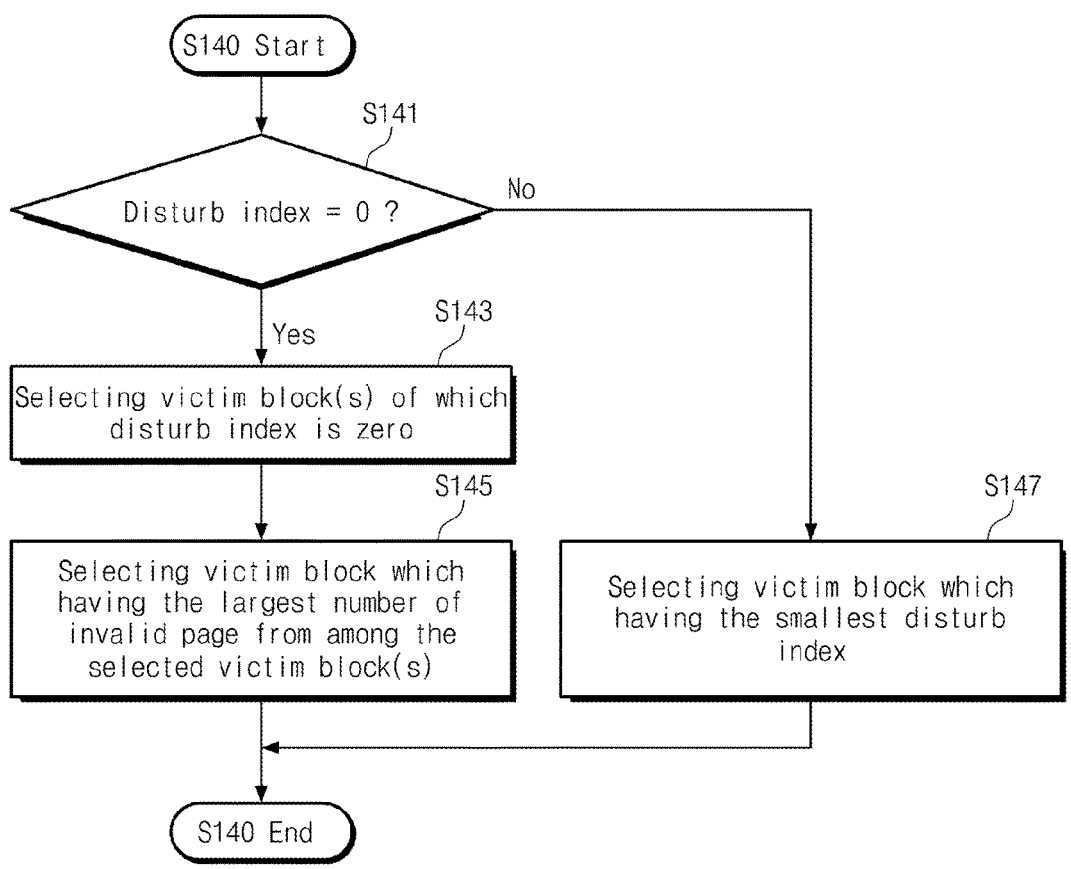
FIG. 14 is a detailed flow chart of step S140 shown in FIG. 13.

FIG. 14 is a detailed flow chart of step S140 shown in FIG. 13.

In step S141, whether a value of a disturb index of each memory block is "0" may be determined. When a memory block of which the disturb index has a value of "0" exists, the method proceeds to step S143. When a memory block of which the disturb index has a value of "0" does not exist, the method proceeds to step S147.

In step S143, each memory block of which the disturb index has a value of "0" may be first selected as a victim block.

In step S145, a memory block, having the most number of invalid pages, from among memory blocks of which the disturb indexes have a value of "0" may be finally selected as a victim block. On this occasion, the invalid pages may include a logically erased page and a page at which dummy data is programmed. However, a physically erased page may be included in the invalid pages. inventive concepts may not be limited to the event that one victim block is selected. A plurality of memory blocks may be selected such that a memory block including the most number of invalid pages is first selected and a memory block including the least number of invalid pages is finally selected. However, inventive concepts are not limited thereto.

When the memory blocks do not include a memory block of which the disturb index has a value of "0", in step S147, a memory block of which the disturb index has the smallest value may be selected. Likewise, a plurality of memory blocks may be selected such that a memory block including the most number of invalid pages is first selected and a memory block including the least number of invalid pages is finally selected. However, inventive concepts are not limited thereto.

Figure 15:
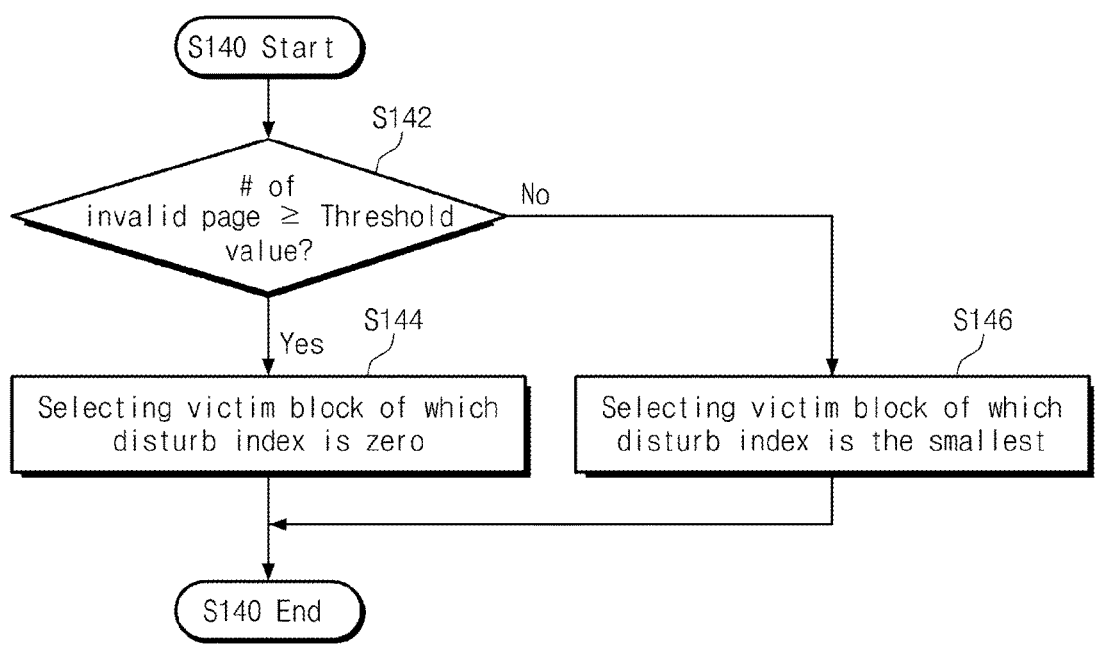
FIG. 15 is a detailed flow chart of step S140 shown in FIG. 13, according to example embodiments of inventive concepts.

FIG. 15 is a detailed flow chart of step S140 shown in FIG. 13, according to example embodiments of inventive concepts. As described with reference to FIG. 8, example embodiments of inventive concepts may be executed when a system resource is relatively insufficient. However, inventive concepts are not limited thereto.

In step S142, whether the number of invalid pages of each memory block is greater than or equal to a threshold value may be determined. When the number of invalid pages of each memory block is greater than or equal to the threshold value, the method proceeds to step S144. When the number of invalid pages of each memory block is smaller than the threshold value, the method proceeds to step S146.

In step S144, a memory block of which the disturb index has a value of "0" may be selected as a victim block. In the event that a memory block of which the disturb index has a value of "0" is in plurality, a victim block may be randomly selected from a group of the memory blocks of which the disturb indexes have a value of "0". Alternatively, a memory block of which a second interval is longest or shortest may be selected. In addition, a plurality of victim blocks may be selected.

In step S146, a memory block of which the disturb index has the smallest value may be selected as a victim block. Likewise, a plurality of victim blocks may be selected in descending order of values of their disturb indexes.

Figure 16:
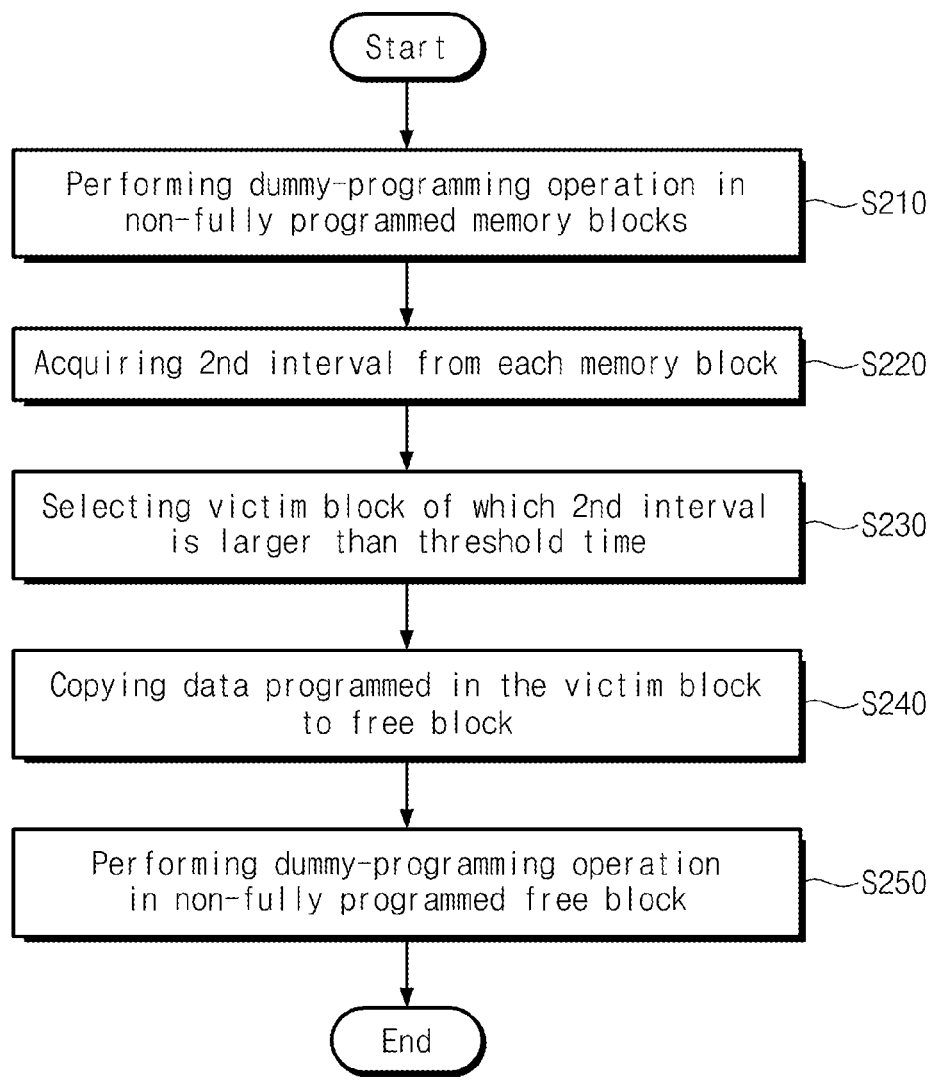
FIG. 16 is a flow chart showing an operating method of a data storage device according to example embodiments of inventive concepts.

FIG. 16 is a flow chart showing an operating method of a data storage device according to example embodiments of inventive concepts.

In step S210, a dummy programming operation may be performed with respect to memory blocks, not fully programmed with user data, dummy data, or user data and dummy data, from among memory blocks. Step S210 may be similar to step S110 shown in FIG. 13, and a duplicated description is thus omitted.

In step S220, information associated with a second interval may be acquired. The acquired information about the second interval may be managed by a disturb manager 1122 (refer to FIG. 4) of a memory controller. The acquired information may be periodically stored at a meta-area of a nonvolatile memory device 1200 (refer to FIG. 4). Information that forms the basis of the second interval and is associated with a point in time when a final program operation about each memory block is completed may be acquired from a response to a ready/busy signal R/B that a memory controller 1100 (refer to FIG. 1) sends to the nonvolatile memory device 1200.

In step S230, a victim block corresponding to a garbage collection target may be selected. To select a victim, first, memory blocks of which the second intervals are greater than a reference value may be selected. A memory block, having the most number of invalid pages, from among the selected memory blocks may be selected as a victim block. However, the number of victim blocks may be in plurality. In this case, the victim blocks may be selected such that a memory block including the most number of invalid pages is first selected and a memory block including the least number of invalid pages is finally selected. However, inventive concepts are not limited thereto. However, inventive concepts are not limited thereto.

In step S240, data stored at the victim block may be copied into a free block. At the same time, user data stored at the victim block may be physically erased.

In step S250, pages of the free block which are not programmed may be programmed with dummy data. A dummy programming operation may be performed according to a dummy closing policy. As an exception, the dummy programming operation may be performed at sudden power-off or when a power-off reset (POR) event is issued.

According to example embodiments of inventive concepts, unlike a typical garbage collection operation, a garbage collection operation may be performed based on a disturb index that is calculated based on a first interval and a second interval. Alternatively, the garbage collection operation may be performed based on the second interval. Thus, it is possible to improve the reliability of a nonvolatile memory device by solving various problems due to a fabrication characteristic of a three-dimensional nonvolatile memory device.

Inventive concepts is applicable to VNAND.

Figure 17:
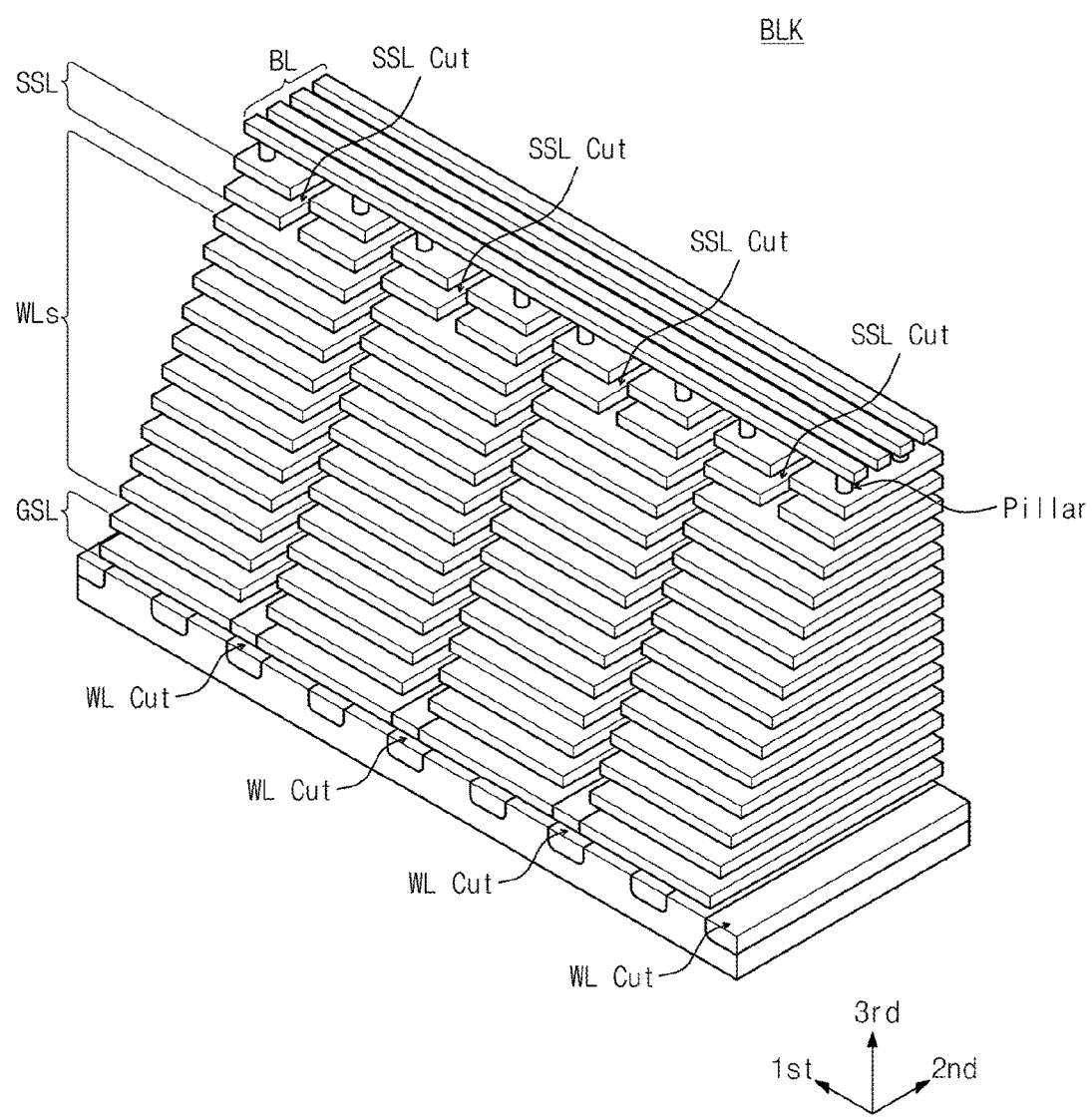
FIG. 17 is a perspective view of a block of VNAND according to example embodiments of inventive concepts.

FIG. 17 is a perspective view of a block of VNAND according to example embodiments of inventive concepts. Referring to FIG. 17, four sub blocks may be formed on a substrate. Each sub block may be formed by stacking and cutting at least one ground selection line GSL, a plurality of word lines WL, and at least one string selection line SSL on the substrate in a plate shape. The at least one string selection line SSL may be separated by string selection line cuts SSL Cut. Although not shown in FIG. 17, each word line cut may include a common source line CSL. In example embodiments, the common source lines CSL included in the word line cuts WL Cut may be interconnected. A string may be formed by making a pillar Pillar connected to a bit line BL penetrate the at least one string selection line SSL, the word lines, and the at least one ground selection line GSL.

In FIG. 16, a non-limiting example is shown where a structure between word line cuts adjacent to each other is a sub block. However, inventive concepts are not limited thereto. For example, a structure between a word line cut and a string selection line cut may be defined as a sub block.

The block BLK according to example embodiments of inventive concepts may be implemented to have a merged word line structure where two word lines are merged to one.

Figure 18:
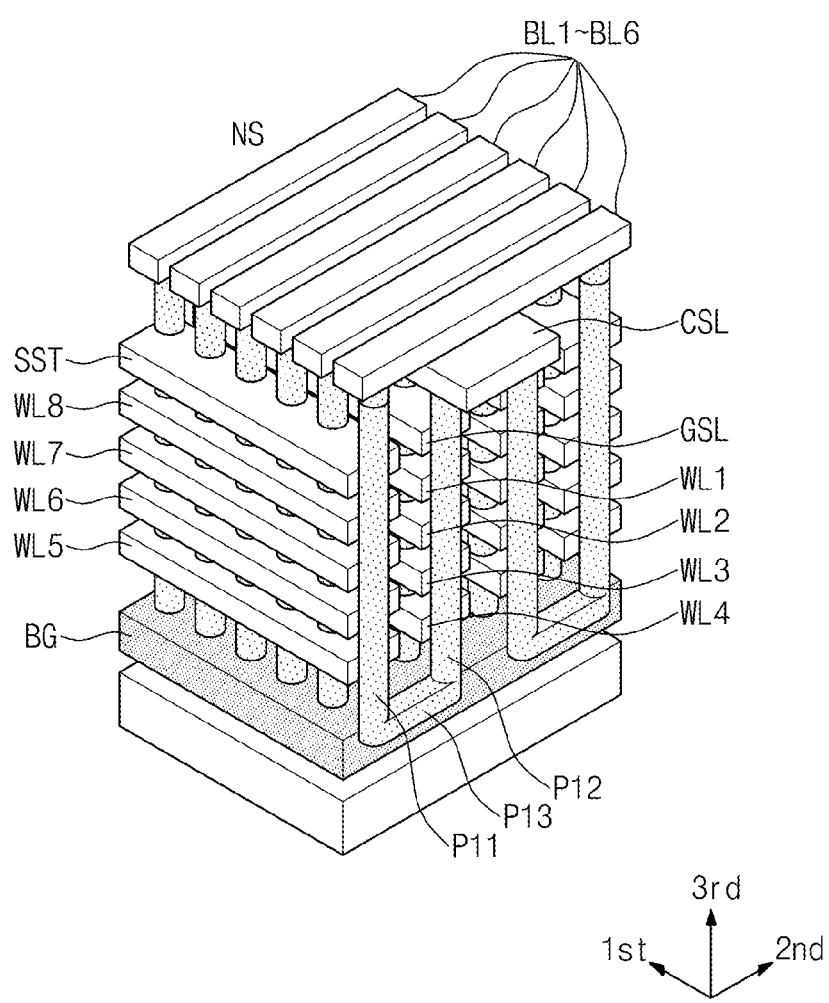
FIG. 18 is a perspective view of a block of VNAND according to example embodiments of inventive concepts.

FIG. 18 is a perspective view of a block of VNAND according to example embodiments of inventive concepts. For the sake of easy understanding, it is assumed that the number of word line layers is 4, but the number of word line layers is not limited thereto. Referring to FIG. 18, a memory block BLK may be implemented to have a PBiCS (pipe-shaped bit cost scalable) structure in which lower ends of adjacent memory cells connected in series are connected through pipes. A memory block may contain m-by-n strings NS (n and m being a natural number).

In FIG. 18, m=6 and n=2. Each string NS may contain memory cells MC1 through MC8 that are connected in series. First upper ends of the memory cells MC1 through MC8 may be connected to string selection transistors SST, second upper ends thereof are connected to ground selection transistors GST, and lower ends thereof are connected through pipes.

In each string NS, memory cells may be formed to be stacked on a plurality of semiconductor layers. Each string NS may contain a first pillar P11, a second pillar P12, and a pillar connection portion P13 connecting the first and second pillars P11 and P12. The first pillar P11 may be connected to a bit line (e.g., BL1) and the pillar connection portion P13, and it may be formed to penetrate a string selection line SSL and word lines WL5 through WL8. The second pillar P12 may be connected to a common source line CSL and the pillar connection portion P13 and is formed to penetrate a ground selection line GSL and word lines WL1 through WL4. As illustrated in FIG. 18, each string NS may be formed with a U-shaped pillar.

In example embodiments, a back-gate BG may be formed on a substrate, and the pillar connection portion P13 may be embedded in the back-gate BG. In example embodiments, the back-gate BG may be used in common in the block BLK. The back-gate BG may be separated from a back-gate of another block.

Inventive concepts may be applied to a solid state drive (SSD).

Figure 19:
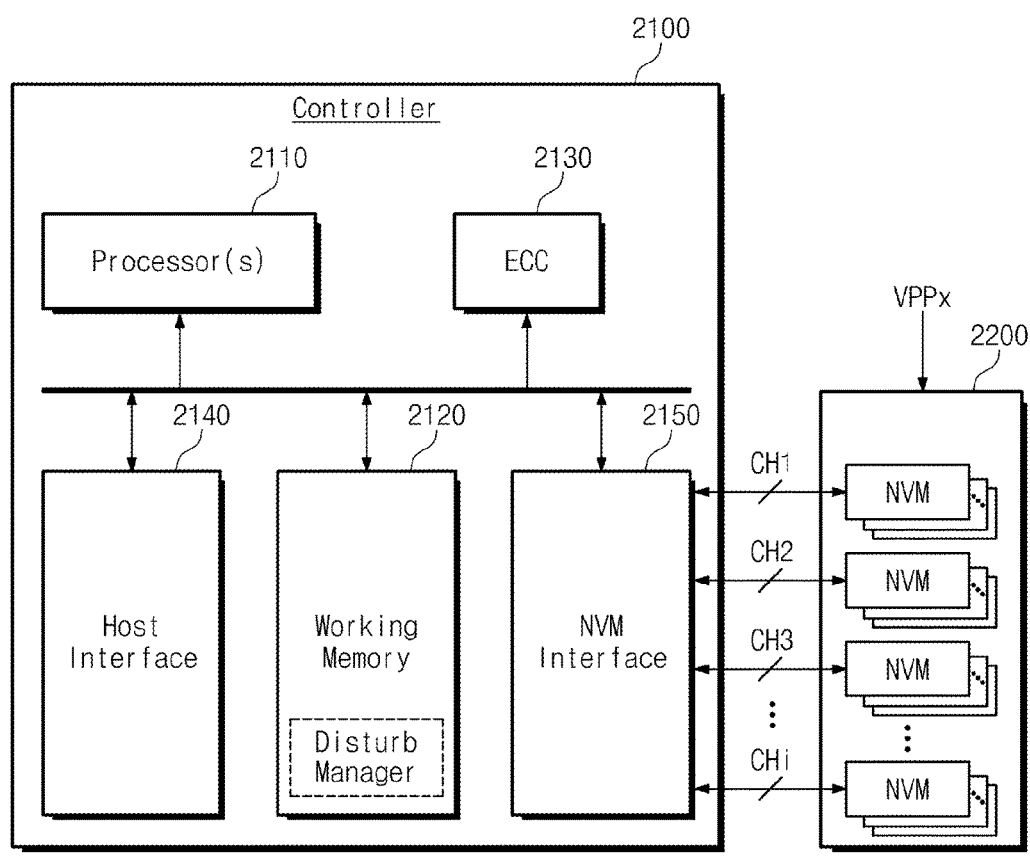
FIG. 19 is a block diagram schematically illustrating a solid state drive according to example embodiments of inventive concepts.

FIG. 19 is a block diagram schematically illustrating a solid state drive according to example embodiments of inventive concepts. Referring to FIG. 19, a solid state drive (hereinafter, referred to as SSD) 2000 may include a plurality of nonvolatile memory devices 2200 and an SSD controller 2100.

The SSD controller 2100 may be connected to the nonvolatile memory devices 2200 through a plurality of channels CH1 through CHi (i being an integer of 2 or more). The SSD controller 2100 may include at least one processor 2110, a working memory 2120, an ECC block 2130, a host interface 2140, and a nonvolatile memory interface 2150.

The working memory 2120 may temporarily store data needed to drive the SSD controller 2100. The working memory 2120 may load information (e.g., a first interval, a second interval, and a disturb index) stored at a meta-area (not shown) of the nonvolatile memory device 2200 and may manage information associated with each memory block in real time. Information loaded on the working memory 2120 may be updated and may be periodically stored at the meta-area of the nonvolatile memory device 2200. A flash translation layer loaded on the working memory 2120 may perform a garbage collection operation according to a table.

The ECC block 2130 may be configured to calculate an ECC value of data to be programmed at a write operation, correct an error of read data according to an ECC value at a read operation, and it may correct an error of data restored from the nonvolatile memory device 2200 at a data restoration operation. Although not shown in FIG. 19, a code memory may be further included to store code data needed to drive the SSD controller 2100. The code memory may be implemented with a nonvolatile memory device.

The host interface 2150 may provide an interface with an external device. The host interface 2150 may be a NAND flash interface. Besides, the host interface 2150 may be implemented with various interfaces or with a plurality of interfaces. The nonvolatile memory interface 2160 may provide an interface with the nonvolatile memory devices 2200.

The nonvolatile memory device 2200 may be a three-dimensional nonvolatile memory device that includes cell strings of memory cells formed in a direction perpendicular to a substrate. The nonvolatile memory device 2200 may be optionally supplied with an external high voltage Vppx. Pieces of information that a disturb manager manages may be periodically stored at the meta-area of the nonvolatile memory device 2200.

The SSD 2000 according to example embodiments of inventive concepts may execute a garbage collection operation based on information. Thus, the reliability of the SSD 2000 may be improved by solving various problems due to a fabrication characteristic of the three-dimensional nonvolatile memory device.

Inventive concepts are applicable to an eMMC (e.g., an embedded multimedia card, moviNAND, iNAND, etc.).

Figure 20:
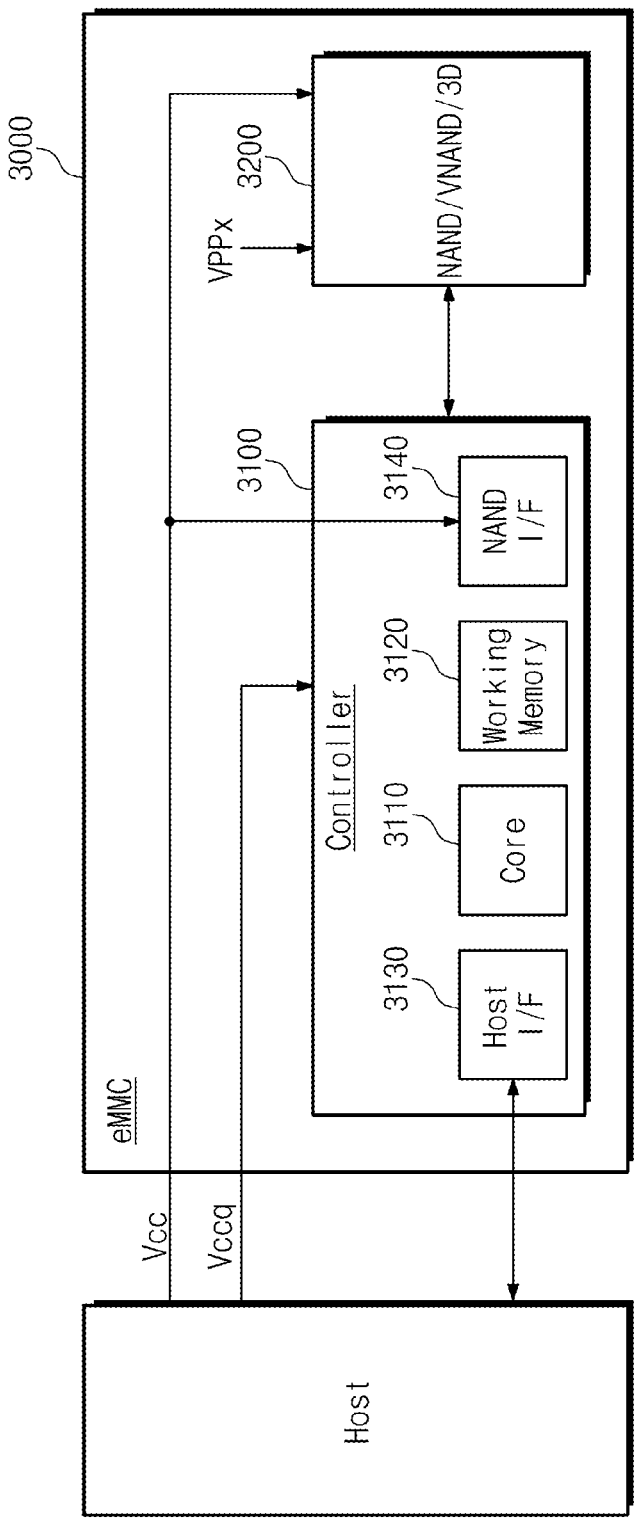
FIG. 20 is a block diagram schematically illustrating an eMMC according to example embodiments of inventive concepts.

FIG. 20 is a block diagram schematically illustrating an eMMC according to example embodiments of inventive concepts. Referring to FIG. 20, an eMMC 3000 may include a controller 3100 and at least one NAND flash memory device 3200.

The controller 3100 may be connected to the NAND flash memory device 3200 via a plurality of channels. The controller 3100 may include at least one controller core 3110, a working memory 3120, a host interface 3130, and a NAND interface 3140. The controller core 3110 may control an overall operation of the eMMC 3000. A disturb manager and a flash translation layer may be loaded on the working memory 3120 to perform a garbage collection operation. The host interface 3130 may be configured to interface between the controller 3100 and a host. The NAND interface 3140 is configured to interface between the NAND flash memory device 3200 and the controller 3100. In example embodiments, the host interface 3130 may be a parallel interface (e.g., MMC interface). In example embodiments, the host interface 3130 of the eMMC 3000 may be a serial interface (e.g., UHS-II, UFS interface, etc.). As another example, the host interface 3130 may be a NAND interface.

The nonvolatile memory device 3200 may be a three-dimensional nonvolatile memory device that includes cell strings of memory cells formed in a direction perpendicular to a substrate. Pieces of information that a disturb manager manages may be periodically stored at the meta-area of the nonvolatile memory device 3200.

The eMMC 3000 may receive power supply voltages Vcc and Vccq from the host. Here, the power supply voltage Vcc (e.g., about 3.3 V) may be supplied to the NAND flash memory device 3200 and the NAND interface 3140, and the power supply voltage Vccq (e.g., about 1.8 V/3.3 V) may be supplied to the controller 3100. In example embodiments, the eMMC 3000 may be optionally supplied with an external high voltage.

The eMMC 3000 according to example embodiments of inventive concepts may execute a garbage collection operation based on information, thereby improving the reliability of the eMMC 3000.

Figure 21:
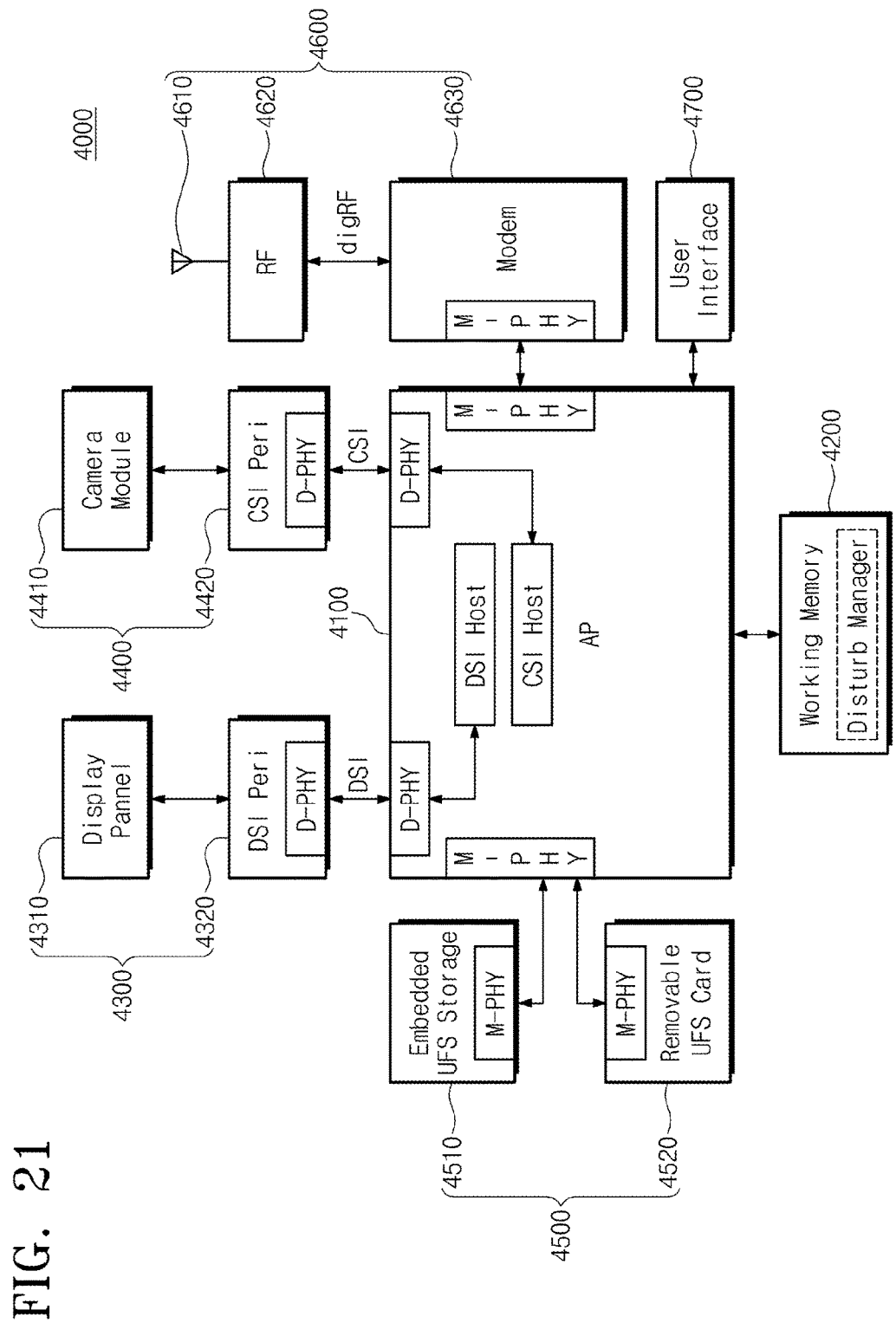
FIG. 21 is a block diagram schematically illustrating a mobile device according to example embodiments of inventive concepts.

FIG. 21 is a block diagram schematically illustrating a mobile device according to example embodiments of inventive concepts. Referring to FIG. 21, a mobile device 4000 may support the MIPI (mobile industry processor interface) or eDP (Embedded DisplayPort) standard. The mobile device 4000 may contain an application processor 4100, a working memory 4200, a display unit 4300, an image processing unit 4400, data storage 4500, an RF transceiver unit 4600, and a user interface 4800.

A disturb manager may be loaded on the working memory 4200 to perform a garbage collection operation according to example embodiments of inventive concepts. Information associated with each memory block of the data storage 4500 may be managed by the disturb manager in real time and may be periodically stored at a meta-are of a memory block of the data storage 4500.

The display unit 4300 may include a display panel 4310 and a DSI (display serial interface) peripheral circuit 4320. The display panel 4310 may display image data. A DSI host embedded in the application processor 4100 may perform serial communications with the display panel 4310 through DSI. The DSI peripheral circuit 4320 may include the following elements needed to drive the display panel 4310: a timing controller and a data driver.

The image processing unit 4400 may include a camera module 4410 and a CSI (camera serial interface) peripheral circuit 4420. The camera module 4410 and the CSI peripheral circuit 4420 may include the following: a lens, an image sensor, and an image processor. An image processor may process image data that the camera module 4410, and the processed image may be provided to the application processor 4100 through CSI.

The data storage 4500 may include embedded UFS storage 4510 and a removable UFS card 4520. The embedded UFS storage 4510 and the removable UFS card 4520 may perform communications with the application processor 4100 through an M-PHY layer. Meanwhile, a host (e.g., application processor 4100) may include a bridge that enables communications with the removable UFS card 4520 using a protocol different from the UFS protocol. Communications between the application processor 4100 and the removable UFS card 4520 may be performed using the following protocols: UFDs, MMC, eMMC SD (secure digital), mini SD, and Micro SD. The embedded UFS storage 4510 and the removable UFS card 4520 may be implemented with a three-dimensional nonvolatile memory device that include cell strings of memory cells formed in a direction perpendicular to a substrate. Information associated with each memory block may be stored at a meta-area of the embedded UFS storage 4510 and the removable UFS card 4520.

The RF transceiver unit 4500 may contain an antenna 4610, an RF part 4620, and a modem 4630. A non-limiting example is shown where the modem 4630 performs communications with the application processor 4100 through an M-PHY layer. However, inventive concepts are not limited thereto. For example, the modem 4630 may be embedded in the application processor 4100.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of operating a data storage device, the data storage device including a nonvolatile memory device and a memory controller configured to control the nonvolatile memory device, the nonvolatile memory device including a plurality of memory blocks on a substrate, the memory blocks each including a plurality of cells strings on the substrate and formed in a direction perpendicular to the substrate, the method comprising:
   programming N memory blocks with dummy data in response to a reference time elapsing from a point in time when each of the N memory blocks is physically erased,
      the N memory blocks, before being programmed with the dummy data, being not fully programmed with user data, dummy data, or the user data and the dummy data, from among the memory blocks,
      N being an integer greater than 1 and less than a number of the plurality of memory blocks in the nonvolatile memory device;
   acquiring a first interval and a second interval from each of the N memory blocks, the first interval being defined by the point in time when each of the N memory blocks is physically erased and a point in time when each of the N memory blocks is fully programmed, the second interval being an interval during which a fully programmed state is maintained in the N memory blocks after the point in time when each of the N memory blocks is fully programmed;
   calculating a disturb index for each of the N memory blocks, respectively, based on the first interval and the second interval, a value of the disturb index increasing as the first interval increases and as the second interval decreases;
   selecting a victim block among the N memory blocks for garbage collection based on the disturb index; and
   copying valid page data of the victim block into a free block among the memory blocks.

2. The method of claim 1, wherein the selecting the victim block includes:
   determining whether a value of the disturb index is 0 for at least one of the N memory blocks.

3. The method of claim 2, wherein the selecting the victim block includes:
   first selecting memory blocks having disturb index values of 0 as eligible victim blocks from among the N memory blocks.

4. The method of claim 3, wherein the selecting the victim block includes:
   determining the victim block based on one of the N memory blocks that has a most number of invalid pages, from among the N memory blocks of which the disturb index values are 0.

5. The method of claim 3, wherein a memory block that is not fully programed with user data, dummy data, or the user data and the dummy data is not selected as the victim block.

6. The method of claim 2, wherein, if none of the N memory blocks have disturb index values that equal 0, the selecting the victim block includes:
   selecting one of the N memory blocks having a lowest value for the disturb index among the N memory blocks as the victim block.

7. The method of claim 1, wherein the selecting the victim block includes:
   determining whether a number of invalid pages is greater than a reference value in each of the N memory blocks.

8. The method of claim 7, wherein the selecting the victim block includes:
   selecting a memory block, of which the disturb index is 0, from among those of the N memory blocks that each have more invalid pages than the reference value as the victim block.

9. The method of claim 1, wherein the calculating the disturb index includes assigning weights respectively added to the first interval and the second interval according to the first interval and the second interval.

10. The method of claim 1, further comprising:
    programming pages of the free block, which are not programmed, with dummy data at a point in time when a reference time elapses from a point in time when the free block is physically erased, if the free block is not fully programmed.

11. The method of claim 1, further comprising:
    programming pages of the free block, which are not programmed, with dummy data, if the free block is not fully programmed and a sudden power-off event or a power-off reset event is issued.

12. A method of operating a data storage device, the data storage device including a nonvolatile memory device and a controller configured to control the nonvolatile memory device, the nonvolatile memory device including a plurality of memory blocks on a substrate, the method comprising:
    performing a dummy closing operation on N memory blocks that are not fully programmed among the plurality of memory blocks,
       N being an integer greater than 1 and less than a number of the plurality of memory blocks,
       the dummy closing operation including programming the N memory blocks with dummy data at respective times corresponding to first intervals after respective erase times for each of the N memory blocks;
    selecting a victim block among the N memory blocks based on one of a selected second interval among second intervals and a selected disturb index among disturb indexes for the N memory blocks,
       the second intervals corresponding to respective times in which each of the N memory blocks are maintained in a fully-programmed state after the performing the dummy closing operation,
       the disturb indexes being calculated by the controller for the N memory blocks based on the first intervals and the second intervals of the N memory blocks; and performing garbage collection on the victim block, the garbage collection including copying valid page data of the victim block into a free block among the memory blocks.

13. The method of claim 12, wherein
the selecting the victim block includes determining whether a value of one of the disturb indexes is 0 for at least one of the N memory blocks, and
selecting the victim block based on one of,
first selecting memory blocks having disturb indexes of 0 as eligible victim blocks among the N memory blocks and determining the victim block based on one of the eligible victims blocks that has a most invalid pages, and
selecting one of the N memory blocks having a lowest disturb index among the disturb indexes as the victim block if none of the N memory blocks have disturb indexes of 0.

14. The method of claim 12, wherein
the selecting the victim block includes first selecting memory blocks in which the second intervals are greater than a threshold value as eligible victim blocks, and
selecting one of the eligible victim blocks that has a greatest number of invalid pages among the eligible victim blocks as the victim block.

15. The method of claim 12, wherein
the selecting the victim block includes determining whether each of the N memory blocks includes a number of invalid pages that is greater than a threshold value, and one of
randomly selecting the victim block among the N memory blocks that include more invalid pages than the threshold value, and
selecting one of the N memory blocks that has a smallest value for the disturb index if each of the N memory blocks has fewer invalid pages than the threshold value.

16. The method of claim 12, wherein
the nonvolatile memory device is a three-dimensional nonvolatile memory device,
the plurality of memory blocks each include a plurality of strings on the substrate, and
the plurality of strings each have one of a U-shaped pillar and a vertical pillar on the substrate.

17. The method of claim 12, wherein
the N memory blocks, before the performing the dummy closing operation, are not fully programmed with user data, dummy data, or the user data and the dummy data, from among the memory blocks, and
the selecting the victim block includes acquiring the second interval among the second intervals for the N memory blocks, and
selecting the victim block for garbage collection when the second interval exceeds a threshold time.

18. The method of claim 17, wherein the threshold time varies with both a point in time when each of the N memory blocks is physically erased and a point in time when each of the N memory blocks is fully programmed.

19. The method of claim 18, further comprising:
programming pages of the free block, which are not programmed, with dummy data at a point in time when a reference time elapses from a point in time when the free block is physically erased, if the free block is not fully programmed.

20. A method of operating a data storage device, the data storage device including a nonvolatile memory device and a memory controller configured to control the nonvolatile memory device, the nonvolatile memory device including memory blocks which include a plurality of memory cells formed to be perpendicular to a substrate, and a plurality of cell strings, each of which includes serially connected memory cells among the plurality of memory cells, being connected in common to a bit line, the method comprising:
programming at least one non-programmed memory cell of a first memory block with dummy data at a first point in time, at which a first time elapses after the first memory block is physically erased;
programming at least one non-programmed memory cell of a second memory block with dummy data at a second point in time, at which a second time elapses after the second memory block is physically erased;
calculating a first disturb index for the first memory block based on the first time and a third time, wherein a value of the first disturb index increases as the first time increases and as the third time decreases, and the third time is an interval during which a fully programmed state is maintained in the first memory block after the first point in time;
calculating a second disturb index for the second memory block based on the second time and a fourth time, wherein a value of the second disturb index increases as the second time increases and as the fourth time decreases, and the fourth time is an interval during which a fully programmed state is maintained in the second memory block after the second point in time;
selecting a victim block between the first memory block and the second memory block for garbage collection based on the first disturb index and the second disturb index; and
copying valid data of the victim block into a free block among the memory blocks.

21. The method of claim 20, wherein a memory block, among the first memory block and the second memory block, which has a less value of a disturb index is selected as the victim block.

* * * * *